(12) United States Patent
Asano et al.

(10) Patent No.: US 12,249,867 B2
(45) Date of Patent: Mar. 11, 2025

(54) ROTARY ELECTRICAL DEVICE

(71) Applicant: DAIKIN INDUSTRIES, LTD., Osaka (JP)

(72) Inventors: Yoshinari Asano, Osaka (JP); Naohiro Kido, Osaka (JP); Tsukasa Asari, Osaka (JP); Akane Ueda, Osaka (JP); Yuuya Horinouchi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 211 days.

(21) Appl. No.: 17/997,762

(22) PCT Filed: Apr. 30, 2021

(86) PCT No.: PCT/JP2021/017229
§ 371 (c)(1),
(2) Date: Nov. 2, 2022

(87) PCT Pub. No.: WO2021/230113
PCT Pub. Date: Nov. 18, 2021

(65) Prior Publication Data
US 2023/0163646 A1    May 25, 2023

(30) Foreign Application Priority Data
May 11, 2020    (JP) .................... 2020-083123

(51) Int. Cl.
*H02K 1/14*    (2006.01)
(52) U.S. Cl.
CPC ......... *H02K 1/145* (2013.01); *H02K 2213/03* (2013.01)
(58) Field of Classification Search
CPC .. H02K 1/145; H02K 2213/03; H02K 15/063; H02K 3/28; H02K 1/16; H02K 3/12
See application file for complete search history.

(56) References Cited

U.S. PATENT DOCUMENTS

| | | | | |
|---|---|---|---|---|
| 2002/0117932 A1* | 8/2002 | Huang | ............ | H02K 1/2791 310/257 |
| 2006/0273670 A1* | 12/2006 | Tung | ............ | H02K 1/145 310/67 R |
| 2008/0100172 A1* | 5/2008 | Yang | ............ | H02K 1/145 310/426 |

FOREIGN PATENT DOCUMENTS

| | | |
|---|---|---|
| JP | 3086745 U | 7/2002 |
| JP | 2009-201299 | 9/2009 |
| JP | 2020-054025 | 4/2020 |

OTHER PUBLICATIONS

Extended European Search Report mailed on May 13, 2024 with respect to the corresponding European patent application No. 21805083.9.

(Continued)

*Primary Examiner* — Leda T Pham
(74) *Attorney, Agent, or Firm* — IPUSA, PLLC

(57) ABSTRACT

A rotary electrical device includes a rotor having a hollow cylindrical shape or a solid cylindrical; and a stator having an annular shape and surrounding a rotation axis of the rotor. The stator includes a winding and a stator core constituted by a magnetic powder core. The stator core includes multiple cores facing each other with the winding interposed therebetween in an axial direction of the stator. One core of the multiple cores includes a yoke contacting another core, and one or more claw magnetic poles that protrude radially from the yoke toward the rotor. The one or more claw magnetic poles are alternately arranged with claw magnetic poles of the one other core. The yoke has a yoke surface parallel to the axial direction, contacting the other core.

8 Claims, 18 Drawing Sheets

(56) References Cited

OTHER PUBLICATIONS

International Preliminary Report on Patentability for PCT/JP2021/017229 mailed on Nov. 24, 2022.
International Search Report for PCT/JP2021/017229 mailed on Jul. 20, 2021.

* cited by examiner

ROTARY ELECTRICAL DEVICE

TECHNICAL FIELD

The present disclosure relates to a rotary electrical device.

BACKGROUND ART

A claw pole motor in which a first core and a second core, constituting a stator core, are constituted by iron powder cores is known. The first core includes a disk-shaped connecting bottom plate, a plurality of claw magnetic poles projecting from the peripheral edge of the connecting bottom plate in the axial direction, and a circular yoke portion projecting from the center of the connecting bottom plate in the same direction as the claw magnetic poles. The second core includes a disk-shaped connecting bottom plate joined to the circular yoke of the first core, and a plurality of claw magnetic poles projecting from the peripheral edge of the connecting bottom plate in a direction opposite to plurality of claw magnetic poles of the first core (see Patent Document 1, for example).

RELATED-ART DOCUMENTS

Patent Documents

Patent Document 1: Japanese Laid-open Patent Publication No. 2009-201299

SUMMARY OF THE INVENTION

Problem to be Solved by the Invention

When a stator core is formed by press-forming a magnetic powder core, the pressing direction is typically the axial direction of a motor. Thus, the dimensional accuracy in the axial direction may decrease. For example, as in the conventional technique described above, in a case where the first core and the second core are joined together in the axial direction, an unintended gap may be formed between the joined surfaces or a large error may occur in the height of the cores in the joined state.

The present disclosure provides a rotary electrical device that can reduce a decrease in dimensional accuracy in the axial direction.

Means to Solve the Problem

An aspect of the present disclosure provides a rotary electrical device including a rotor having a substantially hollow cylindrical shape or a substantially solid cylindrical shape and configured to be rotatable; and a stator having a substantially annular shape and disposed in a radial direction of the rotor to surround a rotation axis of the rotor. The stator includes a winding that is wound in a substantially annular shape around the rotation axis, and a stator core that surrounds the winding and is constituted by a magnetic powder core. The stator core includes a plurality of cores facing each other with the winding interposed therebetween in an axial direction of the stator. One core of the plurality of cores includes a yoke that is in contact with or in proximity to one other core of the plurality of cores, and one or more claw magnetic poles that protrude from the yoke toward the rotor in the radial direction. The one or more claw magnetic poles of the one core of the plurality of cores are alternately arranged with claw magnetic poles of the one other core, with which or to which the yoke is in contact or in proximity, in a circumferential direction of the stator. The yoke has at least one yoke surface that is substantially parallel to the axial direction, and the yoke surface of the yoke is in contact with or in proximity to the one other core.

With this configuration, a decrease in dimensional accuracy in the axial direction can be reduced.

In the above-described rotary electrical device, a length of the yoke surface in the axial direction may be greater than a half of a length of the yoke in the axial direction.

With this configuration, the magnetic flux passing through the yoke surface can be increased.

In the above-described rotary electrical device, only the yoke surface of the one core may be in contact with or in proximity to the one other core.

With this configuration, a decrease in dimensional accuracy in the axial direction can be further reduced.

In the above-described rotary electrical device, the yoke surface of the one core may be in contact with or in proximity to the one other core in the circumferential direction.

With this configuration, a decrease in dimensional accuracy in the axial direction and in the circumferential direction can be reduced.

In the above-described rotary electrical device, the yoke surface of the one core may be in contact with or in proximity to the one other core in the radial direction.

With this configuration, a decrease in dimensional accuracy in the axial direction and in the radial direction can be reduced.

In the above-described rotary electrical device, in a plan view along the axial direction, the yoke surface may be positioned on a line connecting a center of a width, in the circumferential direction, of at least one claw magnetic pole of the plurality of claw magnetic poles to the rotation axis of the rotor.

With this configuration, the magnetic resistance of a magnetic circuit through which the magnetic flux passes can be reduced.

In the above-described rotary electrical device, the plurality of cores may have a same shape.

With this configuration, the plurality of cores can be formed by the same mold.

In the above-described rotary electrical device, the yoke may include a plurality of internal teeth arranged at equal intervals in the circumferential direction, the plurality of internal teeth having a same width in the circumferential direction, and $\theta_\alpha=180/(2\cdot n)$ and $\theta_\beta=360/(2\cdot N)$ may hold, where $\theta_\alpha$ represents an angle between a center of a width, in the circumferential direction, of each of the claw magnetic poles and an end, in the circumferential direction, of an internal tooth that is closest to the center of the width, n represents a number of the plurality of claw magnetic poles, and $\theta_\beta$ represents an angle between both ends, in the circumferential direction, of each of the claw magnetic poles, and N represents a number of the plurality of internal teeth.

With this configuration, the plurality of cores can be formed in the same shape, and thus, the plurality of cores can be formed by the same mold.

In the above-described rotary electrical device, n may be equal to N or may be a multiple of N.

With this configuration, ease of assembly of the plurality of cores can be facilitated.

MODE FOR CARRYING OUT THE INVENTION

In the following, embodiments will be described.

Figure 1:
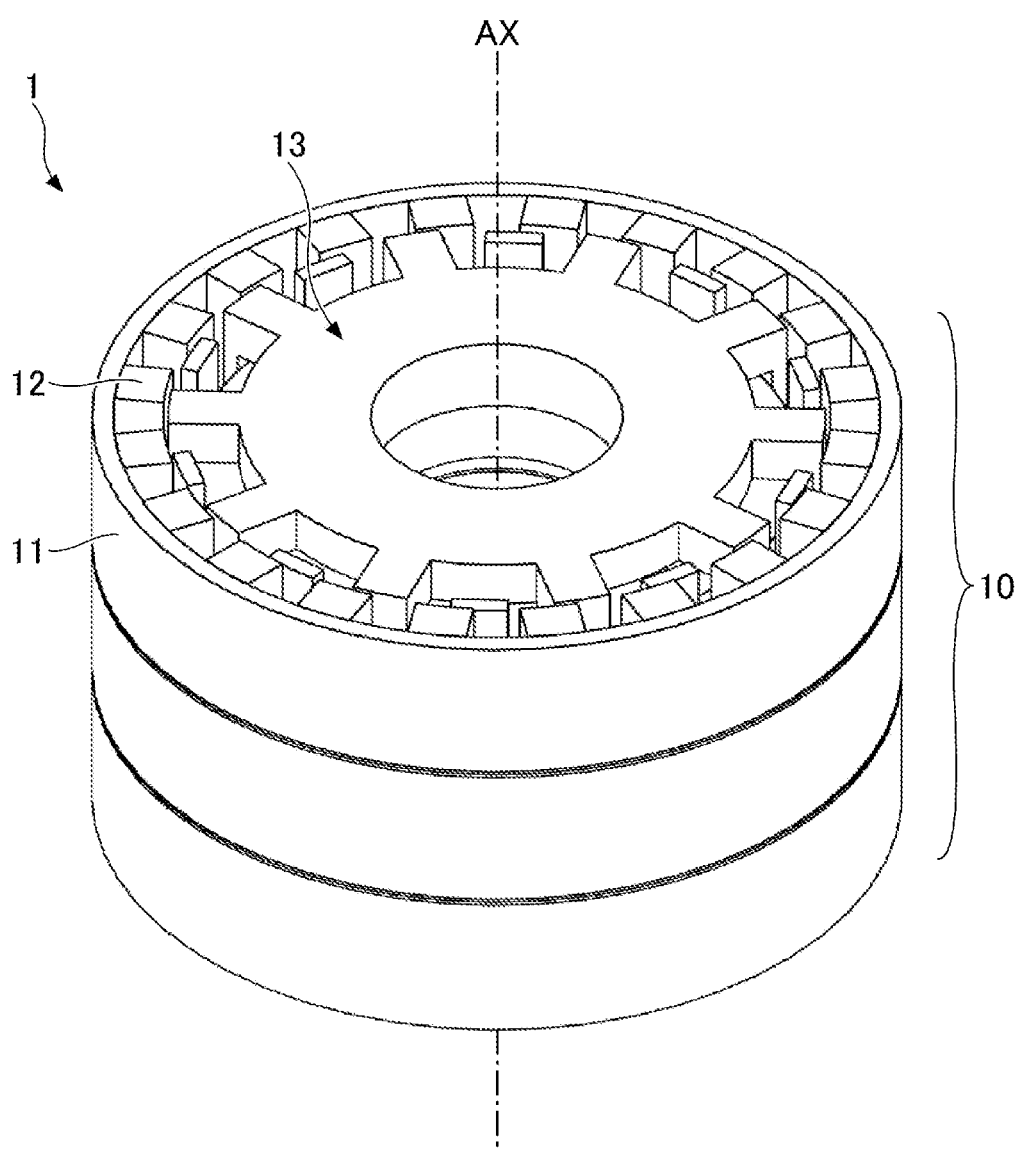
FIG. 1 is a perspective view of an example of a rotary electrical device according to a first embodiment.

FIG. 1 is a perspective view of an example of a rotary electrical device according to a first embodiment. A motor 1 illustrated in FIG. 1 is an example of the rotary electrical device. The motor 1 is an outer-rotor-type claw pole motor in which a rotor 10 is disposed radially outward relative to a stator 13. For example, the motor 1 is mounted on a compressor, a fan, or the like of an air conditioner.

The motor 1 includes the rotor 10 and the stator 13. The rotor 10 has a substantially hollow cylindrical shape and is configured to be rotatable. The stator 13 has a substantially annular shape and is disposed radially inward relative to the rotor 10 to surround a rotation axis AX of the rotor 10.

The rotor 10 is disposed outward in a radial direction of the motor 1 (hereinafter also simply referred to as a "radial direction") with respect to the stator 13. The rotor 10 is configured to be rotatable about the rotation axis AX. The rotor 10 includes a rotor core 11 and a plurality of (in this example, 20) permanent magnets 12.

The rotor core 11 has, for example, a substantially cylindrical shape and is disposed such that the rotation axis AX of the motor 1 substantially coincides with the axis of the cylindrical shape. The rotor core 11 has the substantially same length as the stator 13 in an axial direction of the motor 1 (hereinafter also simply referred to as an "axial direction").

The rotor core 11 is formed of a magnetic material (such as a steel plate, cast iron, or a magnetic powder core). The rotor core 11 may be comprised of one member in the axial direction, or may be comprised of a plurality of members that are stacked in the axial direction (for example, the number of members may correspond to the number of stator units as will be described later).

The plurality of (in this example, 20) permanent magnets 12 are arranged on the inner circumferential surface of the rotor core 11 at equal intervals in the circumferential direction. The permanent magnets 12 are arranged so as to be substantially present between one end and the other end of the rotor core 11. The permanent magnets 12 are, for example, neodymium sintered magnets or ferrite magnets.

Both ends of each of the permanent magnets 12 in the radial direction are magnetized to different magnetic poles. From among the plurality of permanent magnets 12, the inner sides, facing the stator 13 in the radial direction, of two permanent magnets 12 that are adjacent to each other in the circumferential direction are magnetized to different magnetic poles. With this configuration, on the outer side of the stator 13 in the radial direction, permanent magnets 12 whose inner sides in the radial direction are magnetized to N-poles and permanent magnets 12 whose inner sides in the radial direction are magnetized to S-poles are alternately arranged in the circumferential direction.

Each of the permanent magnets 12 may be comprised of one magnet member in the axial direction. Alternatively, each of the permanent magnets 12 may be comprised of a plurality of magnet members that are arranged in the axial direction (for example, the number of magnet members may correspond to the number of stator units as will be described later). In this case, the inner sides, facing the stator 13 in the radial direction, of a plurality of magnet members, which constitute a corresponding permanent magnet 12 and are arranged in the axial direction, are all magnetized to the same magnetic pole.

Note that the plurality of permanent magnets 12 arranged in the circumferential direction may be replaced with a permanent magnet that is comprised of one member and that is magnetized to have alternately different magnetic poles in the circumferential direction, such as an annular ring magnet, or a plastic magnet. In this case, the permanent magnet comprised of one member in the circumferential direction may also be comprised of one member in the axial direction, such that the permanent magnet may be entirely comprised of one member. In addition, the permanent magnet comprised of one member in the circumferential direction may be separated into a plurality of members in the axial direction, as in the case of the plurality of permanent magnets 12. Further, when a plastic magnet comprised of one member in the circumferential direction is employed, the rotor core 11 may be omitted. Regardless of whether a permanent magnet is comprised of a plurality of members or one member, the permanent magnet is magnetized such that a predetermined number of magnetic poles is arranged in the circumferential direction.

Figure 2:
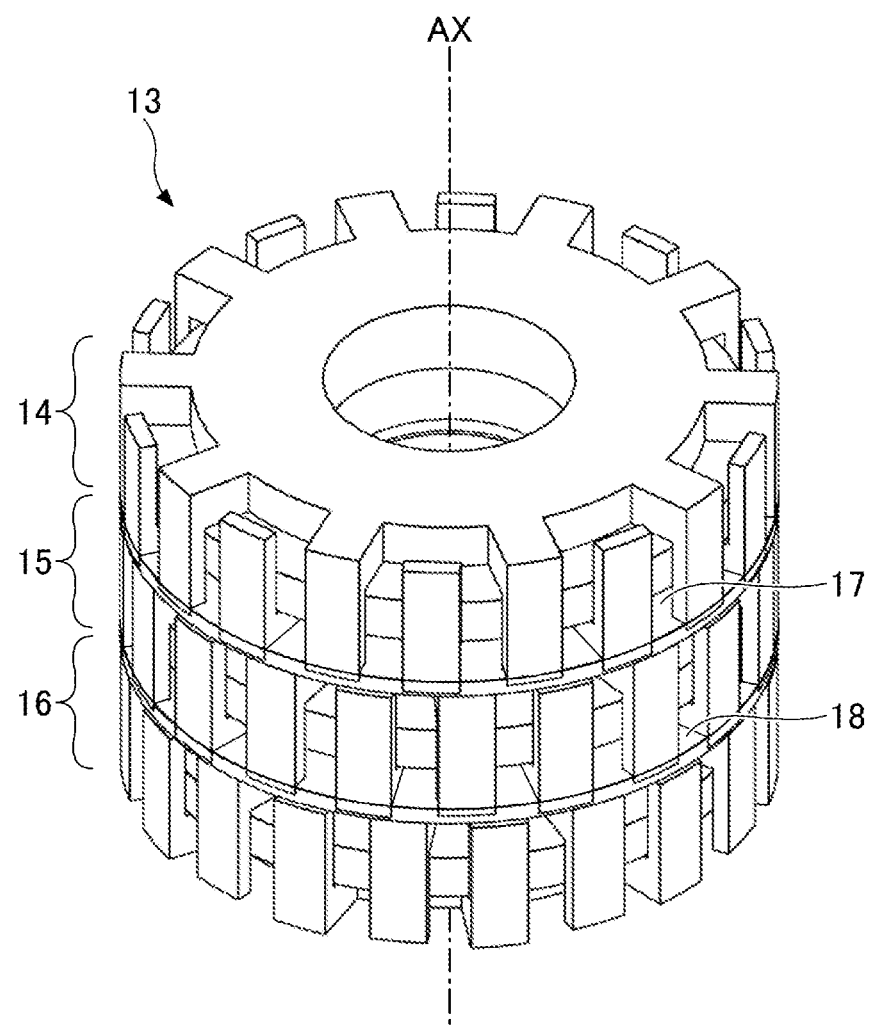
FIG. 2 is a perspective view of an example of a stator according to the first embodiment.

FIG. 2 is a perspective view of an example of a stator according to the first embodiment. Specifically, FIG. 2 is a diagram illustrating the motor from which the rotor 10 of FIG. 1 is removed. The stator 13 illustrated in FIG. 2 is disposed radially inward relative to the rotor 10 (the rotor core 11 and the permanent magnets 12). The stator 13 is a member having a substantially annular shape and is disposed to surround the rotation axis AX of the rotor 10. In this example, the stator 13 includes a plurality of (in this example, three) stator units 14 to 16 that are stacked in the axial direction, and a plurality of (in this example, two) non-magnetic material layers 17 and 18.

The stator 13 includes the stator units 14 to 16 of multiple phases (three phases in this example) having substantially the same structure. Specifically, the stator 13 includes the stator unit 14 of a U-phase, the stator unit 15 of a V-phase, and the stator unit 16 of a W-phase. The plurality of stator units 14 to 16 are offset by an electric angle of 120° in the circumferential direction.

Note that the motor 1 (stator 13) does not necessarily have three phases, and may have one phase or multiple phases (two phases or four or more phases).

The stator 13 includes the non-magnetic material layer 17 between the stator units 14 and 15 that are adjacent to each other in the axial direction, and includes the non-magnetic material layer 18 between the stator units 15 and 16 that are adjacent to each other in the axial direction. The non-magnetic material layer 17 can suppress magnetic flux leakage between the adjacent stator units 14 and 15 of the two different phases. The non-magnetic material layer 18 can suppress magnetic flux leakage between the adjacent stator units 15 and 16 of the two different phases.

The non-magnetic material layer 17 is a U-V interphase member provided between the stator unit 14 of the U-phase and the stator unit 15 of the V-phase, which are adjacent to each other in the axial direction. The non-magnetic material layer 17 has, for example, a substantially disk shape or a substantially cylindrical shape having a predetermined thickness in the axial direction, and a through-hole through which an inserting member (not illustrated) is inserted is formed in the central portion of the non-magnetic material layer 17. The same may apply to the non-magnetic material layer 18. The non-magnetic material layer 18 is a V-W interphase member provided between the stator unit 15 of the V-phase and the stator unit 16 of the W-phase, which are adjacent to each other in the axial direction.

Figure 3:
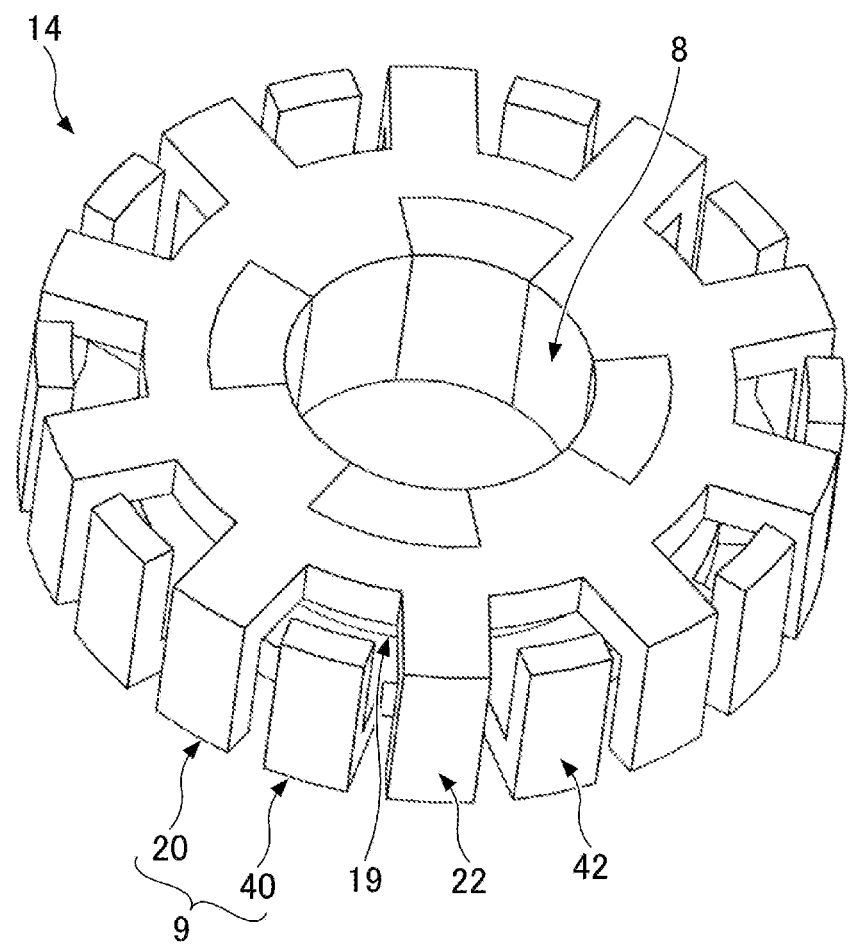
FIG. 3 is a perspective view of an example of a stator unit according to the first embodiment.
Figure 4:
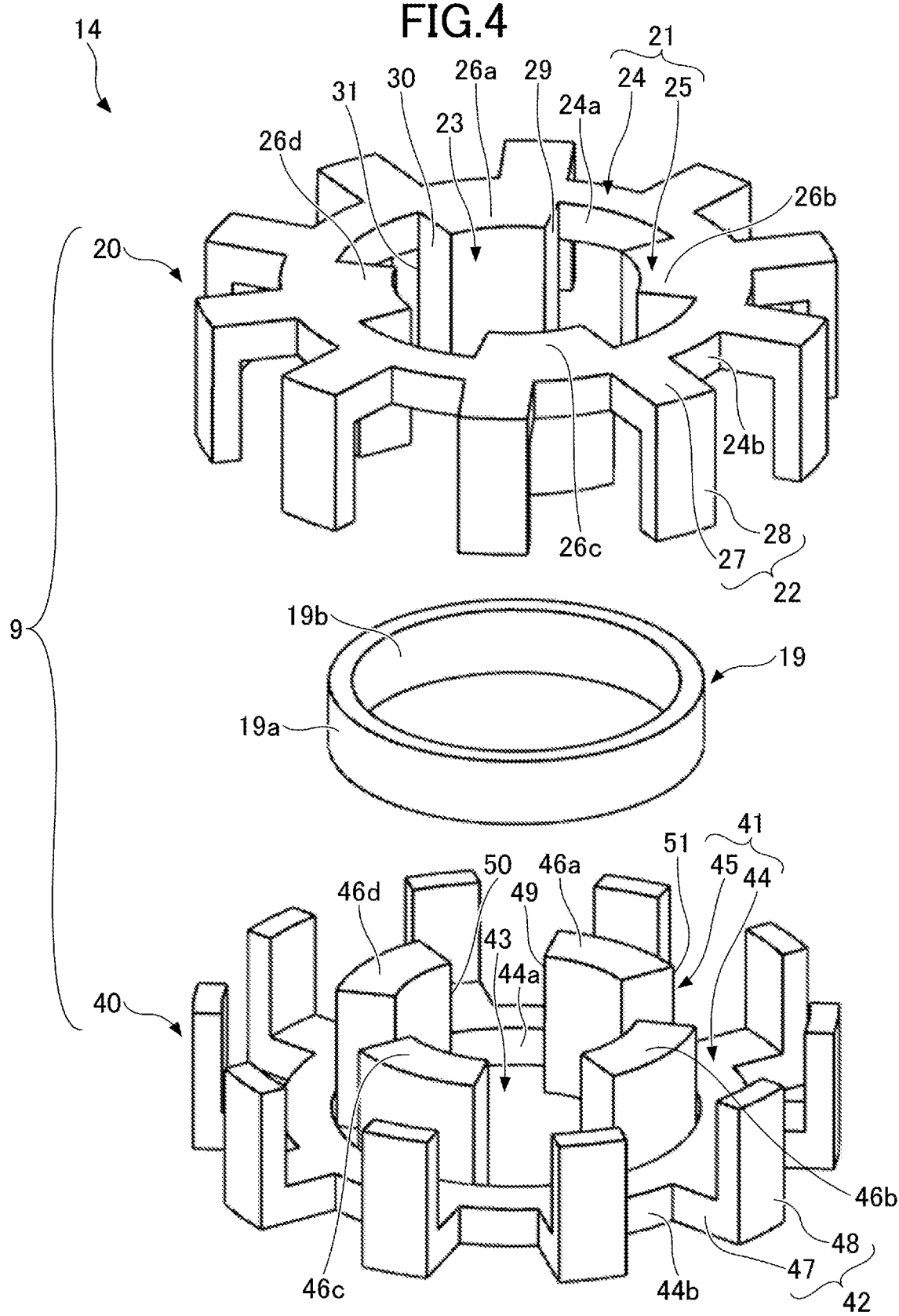
FIG. 4 is an exploded perspective view of an example of the stator unit according to the first embodiment.

FIG. 3 is a perspective view of an example of a stator unit according to the first embodiment. FIG. 4 is an exploded perspective view of an example of the stator unit according to the first embodiment. The above-described stator units 15 and 16 have substantially the same configuration as the stator unit 14 illustrated in FIG. 3 and FIG. 4, and thus, the description of the stator units 15 and 16 will be omitted by referring to the description of the stator unit 14.

The stator unit 14 includes a winding 19 that is wound in a substantially annular shape around the rotation axis AX, a stator core 9 that is provided so as to surround the winding 19, and a through-hole 8 (see FIG. 3) through which an inserting member (not illustrated) is inserted. The stator core 9 is constituted by a magnetic powder core. The stator core 9 constituted by a magnetic powder core can reduce iron loss at high frequencies. The stator core 9 includes a plurality of cores 20 and 40 facing each other with the winding 19 interposed therebetween in the axial direction of the stator 13.

The plurality of cores 20 and 40 are provided so as to surround the winding 19. The plurality of cores 20 and 40 have the same shape.

As illustrated in FIG. 4, the core 20 includes a yoke 21, a plurality of claw magnetic poles 22, and a center hole 23. The core 40 includes a yoke 41, a plurality of claw magnetic poles 42, and a center hole 43.

Each of the yokes 21 and 41 has an annular shape when viewed in the axial direction, and has a predetermined thickness in the axial direction. The yoke 21 is in contact with or in proximity to the other core 40 that is different from its core 20 among the plurality of cores 20 and 40. The yoke 21 includes a first yoke portion 24 having a substantially annular shape and a second yoke portion 25 that contacts the other core 40. The yoke 41 is in contact with or in proximity to the other core 20 that is different from its core 40 among the plurality of cores 20 and 40. The yoke 41 includes a first yoke portion 44 having a substantially annular shape and a second yoke portion 45 that contacts the other core 20.

The second yoke portion 25 protrudes from an inner circumferential surface 24a of the first yoke portion 24 toward the other core 40 by a predetermined amount. In this example, the second yoke portion 25 is a portion that includes a plurality of internal teeth 26 (26a, 26b, 26c, and 26d) arranged at intervals in the circumferential direction. The second yoke portion 45 protrudes from an inner circumferential surface 44a of the first yoke portion 44 toward the other core 20 by a predetermined amount. In this example, the second yoke portion 45 is a portion that includes a plurality of internal teeth 46 (46a, 46b, 46c, and 46d) arranged at intervals in the circumferential direction.

The plurality of claw magnetic poles 22 are arranged at equal intervals in the circumferential direction on an outer circumferential surface 24b of the first yoke portion 24 of the yoke 21. The plurality of claw magnetic poles 22 protrude radially outward from the outer circumferential surface 24b of the first yoke portion 24 of the yoke 21 toward the rotor 10. The plurality of claw magnetic poles 42 are arranged on an outer circumferential surface 44b of the first yoke portion 44 of the yoke 41 at equal intervals in the circumferential direction. The plurality of claw magnetic poles 42 protrude radially outward from the outer circumferential surface 44b of the first yoke portion 44 of the yoke 41 toward the rotor 10. Each of the claw magnetic poles 22 includes a claw magnetic pole portion 27, and each of the claw magnetic poles 42 includes a claw magnetic pole portion 47.

The claw magnetic pole portion 27 has a predetermined width, and protrudes from the outer circumferential surface 24b of the first yoke portion 24 of the yoke 21 by a predetermined length. The claw magnetic pole portion 47 has a predetermined width, and protrudes from the outer circumferential surface 44b of the first yoke portion 44 of the yoke 41 by a predetermined length.

Each of the claw magnetic poles 22 further includes a claw magnetic pole portion 28, and each of the claw magnetic poles 42 further includes a claw magnetic pole portion 48. This configuration allows the area where magnetic pole surfaces of the claw magnetic poles 22 and 42, magnetized by the armature current of the winding 19, and the rotor 10 face each other, to be made relatively large. Therefore, the torque of the motor 1 can be relatively increased, and the output of the motor 1 can be improved.

The claw magnetic pole portion 28 of the core 20 protrudes by a predetermined length from the tip of the claw magnetic pole portion 27 toward the other core 40 of the pair of the cores 20 and 40. For example, the claw magnetic pole portion 28 has a constant width, regardless of the distance from the claw magnetic pole portion 27. The claw magnetic pole portion 48 of the core 40 protrudes by a predetermined length from the tip of the claw magnetic pole portion 47 toward the other core 20 of the pair of the cores 20 and 40. For example, the claw magnetic pole portion 48 has a constant width, regardless of the distance from the claw magnetic pole portion 47.

Note that the claw magnetic pole portions 28 and 48 may be omitted.

The center hole 23 is a through-hole surrounded by the inner peripheral surfaces of the plurality of internal teeth 26 of the second yoke portion 25. The center hole 43 is a through-hole surrounded by the inner peripheral surfaces of the plurality of internal teeth 46 of the second yoke portion 45. The center holes 23 and 43 form the through-hole 8 (see FIG. 3) by combining the cores 20 and 40.

The winding 19 is a conductive wire that is wound in an annular shape when viewed in the axial direction. The winding is also referred to as a coil. Both ends of the winding 19 are electrically connected to external terminals of the motor 1. The external terminals of the motor 1 are electrically connected to a drive device (for example, an inverter or the like) that drives the motor 1 with electric power supplied from a power source.

The winding 19 is disposed between the cores 20 and 40 in the axial direction. The winding 19 is wound such that an outer circumferential portion 19a of the winding 19 is located radially inward relative to the outer circumferential surfaces 24b and 44b of the first yoke portions 24 and 44, and an inner circumferential portion 19b is located radially outward relative to the inner circumferential surfaces 24a and 44a of the first yoke portions 24 and 44.

The winding 19 contacts at least one of the cores 20 and 40, thereby improving the heat dissipation performance of the winding 19. For example, the winding 19 is interposed between the first yoke portion 24 and the first yoke portion 44 while contacting one or both of the first yoke portion 24 and the first yoke portion 44 in the axial direction. The winding 19 may contact one or both of the second yoke portion 25 and the second yoke portion 45. The winding 19 may contact at least one of the cores 20 and 40 via a bobbin (not illustrated).

The winding 19 may be insulated by a known method using a core mold, a bobbin, or the like. Examples of an insulating method include winding an insulating tape around an air core coil and using a mold. As the material of the winding 19, a round wire, a square wire, or a litz wire can be used. Preferably, a square wire or a round wire wound in an aligned state may be used.

As illustrated in FIG. 3, the cores 20 and 40 are combined such that the claw magnetic poles 22 of the one core 20 and the claw magnetic poles 42 of the other core 40 are alternately arranged in the circumferential direction. Specifically, the plurality of claw magnetic poles 22 of the one core 20 are alternately arranged with the claw magnetic poles 42 of the other core 40 in the circumferential direction of the stator core 9 (in the circumferential direction of the stator 13). Note that the core 20 may include one claw magnetic pole 22, and the core 40 may include one claw magnetic pole 42. In this case, alternately arranging the one claw magnetic pole 22 and the one claw magnetic pole 42 in the circumferential direction means that the one claw magnetic pole 22 is located on one side in the circumferential direction, and the claw magnetic pole 42 is located on the other side in the circumferential direction.

When an armature current flows through the annular winding 19, the claw magnetic poles 22 of the one core 20 of the pair of cores 20 and 40, and the claw magnetic poles 42 of the other core 40 are magnetized to have different magnetic poles. With this configuration, the claw magnetic poles 22, protruding from the one core 20 of the pair of cores 20 and 40, are adjacent to the claw magnetic poles 42 protruding from the other core 40 in the circumferential direction, and the claw magnetic poles 22 have a different magnetic pole from the claw magnetic poles 42. Therefore, in the circumferential direction of the stator core 9 (the pair of cores 20 and 40), a combination of the N-pole claw magnetic poles 22 and the S-pole claw magnetic poles 42 and a combination of the N-pole claw magnetic poles 42 and the S-pole claw magnetic poles 22 are alternately generated by the armature current flows through the winding 19.

In a state in which the cores 20 and 40 are combined with the winding 19 being interposed therebetween, the plurality of internal teeth 26 may protrude beyond the core 40 in the axial direction, but are not necessarily required to protrude beyond the core 40 in the axial direction, and the plurality of internal teeth 46 may protrude beyond the core 20 in the axial direction, but are not necessarily required to protrude beyond the core 20 in the axial direction. A spacer may be inserted between the cores 20 and 40 so as to adjust the length of the stator core 9 in the axial direction.

A yoke of one core of the pair of cores 20 and 40 has at least one yoke surface that is substantially parallel to the axial direction, and the yoke surface of the one core is in contact with or in proximity to the other core. In this example, the yoke 21 of the core 20 has yoke surfaces 29 that are in contact with or in proximity to yoke surfaces 49 of the yoke 41 of the core 40, and also has yoke surfaces 30 that are in contact with or in proximity to yoke surfaces 50 of the yoke 41 of the core 40.

The yoke surfaces 29 are surfaces provided on the respective internal teeth 26 (26a, 26b, 26c, and 26d) of the second yoke portion 25 and facing one circumferential direction (the clockwise direction in FIG. 3 and FIG. 4). The yoke surfaces 30 are surfaces provided on the respective internal teeth 26 (26a, 26b, 26c, and 26d) of the second yoke portion 25 and facing the opposite circumferential direction (the counterclockwise direction in FIG. 3 and FIG. 4). The yoke surfaces 50 are surfaces provided on the respective internal teeth 46 (46a, 46b, 46c, and 46d) of the second yoke portion 45 and facing one circumferential direction (the clockwise direction in FIG. 3 and FIG. 4). The yoke surfaces 49 are surfaces provided on the respective internal teeth 46 (46a, 46b, 46c, and 46d) of the second yoke portion 45 and facing the opposite circumferential direction (the counterclockwise direction in FIG. 3 and FIG. 4).

Each of the internal teeth 26 is in contact with or in proximity to two internal teeth, of the plurality of internal teeth 46, adjacent to both sides of a corresponding internal tooth 26 in the circumferential direction. In other words, each of the internal teeth 46 is in contact with or in proximity to two internal teeth, of the plurality of internal teeth 26, adjacent to both sides of a corresponding internal tooth 46 in the circumferential direction. Specifically, in the case of the internal tooth 26a whose one side in the circumferential direction is adjacent to the internal tooth 46a and the other side in the circumferential direction is adjacent to the internal tooth 46d, a yoke surface 29 of the internal tooth 26a is in contact with or in proximity to a yoke surface 49 of the internal tooth 46a, and a yoke surface 30 of the internal tooth 26a is in contact with or in proximity to a yoke surface 50 of the internal tooth 46d. The same applies to the other internal teeth. In this manner, each of the yoke surfaces 29 is in contact with or in proximity to a corresponding yoke surface 49 of the plurality of yoke surfaces 49, and each of the yoke surfaces 30 is in contact with or in proximity to a corresponding yoke surface 50 of the plurality of yoke surfaces 50.

Further, in this example, the yoke 21 of the core 20 has outer peripheral surfaces 31 that are in contact with or in proximity to the inner circumferential surface 44a of the yoke 41 of the core 40. The yoke 41 of the core 40 has outer peripheral surfaces 51 that are in contact with or in proximity to the inner circumferential surface 24a of the yoke 21 of the core 20. Each of the inner circumferential surfaces 24a and 44a and the outer peripheral surfaces 31 and 51 is a yoke surface that is substantially parallel to the axial direction.

The outer peripheral surfaces 31 are curved surfaces that are provided on the respective internal teeth 26 (26a, 26b, 26c, and 26d) of the second yoke portion 25 and face radially outward. The outer peripheral surfaces 51 are curved surfaces that are provided on the respective internal teeth 46 (46a, 46b, 46c, and 46d) of the second yoke portion 45 and face radially outward.

As described, a yoke of one core of the cores 20 and 40 has at least one yoke surface that is substantially parallel to the axial direction, and the yoke surface of the one core is in contact with or in proximity to the other core. With this configuration, when the cores 20 and 40 are formed by press-forming magnetic powder cores in the axial direction, because the yoke surface is substantially parallel to the pressing direction, the dimensional accuracy of the yoke surface does not readily decrease. Therefore, a decrease in the dimensional accuracy of the stator core 9 in the axial direction can be reduced.

Further, each of the second yoke portions 25 and 45 of the cores 20 and 40 is not provided on the entire circumference of the cores 20 and 40. The second yoke portions 25 and 45 are constituted by the plurality of internal teeth 26 and 46, respectively, and the total length of the internal teeth 26 and the total length of the internal teeth 46 in the circumferential direction are each approximately half the circumference of a corresponding core. Therefore, the projected area in the axial direction of each of the cores 20 and 40 is reduced. As a result, the pressure by which the magnetic powder cores are press-formed can be reduced, thereby reducing the size of, for example, a pressing device.

Further, the cores 20 and 40 and the winding 19 can be brought into contact with each other by fitting the cores 20 and 40 in the axial direction until the yokes 21 and 41 touch the winding 19. Accordingly, the performance of heat dissipation from the winding 19 to the cores 20 and 40 can be improved.

Note that when the yoke surfaces of one core are in contact with the other core, the yoke surfaces of the one core may be joined, fitted, bonded, or pressure-bonded to the other core. In a case where the yoke surfaces of one core are in proximity to the other core, there may be a gap as small as the size of part of a magnetic path.

In the first embodiment, the length of each of the yoke surfaces 29 and 30 in the axial direction is greater than a half of the length of the yoke 21 in the axial direction. In this example, the length of each of the yoke surfaces 29 and 30 in the axial direction is substantially the same as the length of the yoke 21 in the axial direction. In the first embodiment, the length of each of the yoke surfaces 49 and 50 is greater than a half of the length of the yoke 41 in the axial direction. In this example, the length of each of the yoke surfaces 49 and 50 is substantially the same as the length of the yoke 41 in the axial direction. With this configuration, the magnetic flux that passes through the yoke surfaces 29, 30, 49, and 50 can be increased. Thus, the torque of the motor 1 can be increased, for example.

In the first embodiment, only the yoke surfaces (the yoke surfaces 29 and 30 and the outer peripheral surfaces 31) of the core 20 are in contact with or in proximity to the core 40, and only the yoke surfaces (the yoke surfaces 49 and 50 and the outer peripheral surfaces 51) of the core 40 are in contact with or in proximity to the core 20. With this configuration, even when the cores 20 and 40 are constituted by magnetic powder cores press-formed in the axial direction, because the yoke surfaces are substantially parallel to the pressing direction, the dimensional accuracy of the yoke surfaces does not readily decrease. Therefore, a decrease in the dimensional accuracy of the stator core 9 in the axial direction can be further reduced.

In the first embodiment, the yoke surfaces 29 and 30 of the core 20 are in contact with or in proximity to the core 40 in the circumferential direction, and the yoke surfaces 49 and 50 of the core 40 are in contact with or in proximity to the core 20 in the circumferential direction. With this configuration, even when the cores 20 and 40 are constituted by magnetic powder cores press-formed in the axial direction, because the yoke surfaces are substantially parallel to the pressing direction, the dimensional accuracy of the yoke surfaces does not readily decrease. Therefore, a decrease in the dimensional accuracy of the stator core 9 in the axial direction can be further reduced.

In the first embodiment, the yoke surfaces (in this example, the outer peripheral surfaces 31) of the core 20 are in contact with or in proximity to the core 40 in the radial direction, and the yoke surfaces (in this example, the outer peripheral surfaces 51) of the core 40 are in contact with or in proximity to the core 20 in the radial direction. With this configuration, even when the cores 20 and 40 are constituted by magnetic powder cores press-formed in the axial direction, because the yoke surfaces are substantially parallel to the pressing direction, the dimensional accuracy of the yoke surfaces does not readily decrease. Therefore, a decrease in the dimensional accuracy of the stator core 9 in the axial direction can be further reduced.

In the first embodiment, the plurality of cores 20 and 40 have the same shape. With this configuration, the plurality of cores 20 and 40 can be formed by the same mold. Therefore, the manufacturing cost of the stator core 9 can be reduced, for example.

Figure 5:
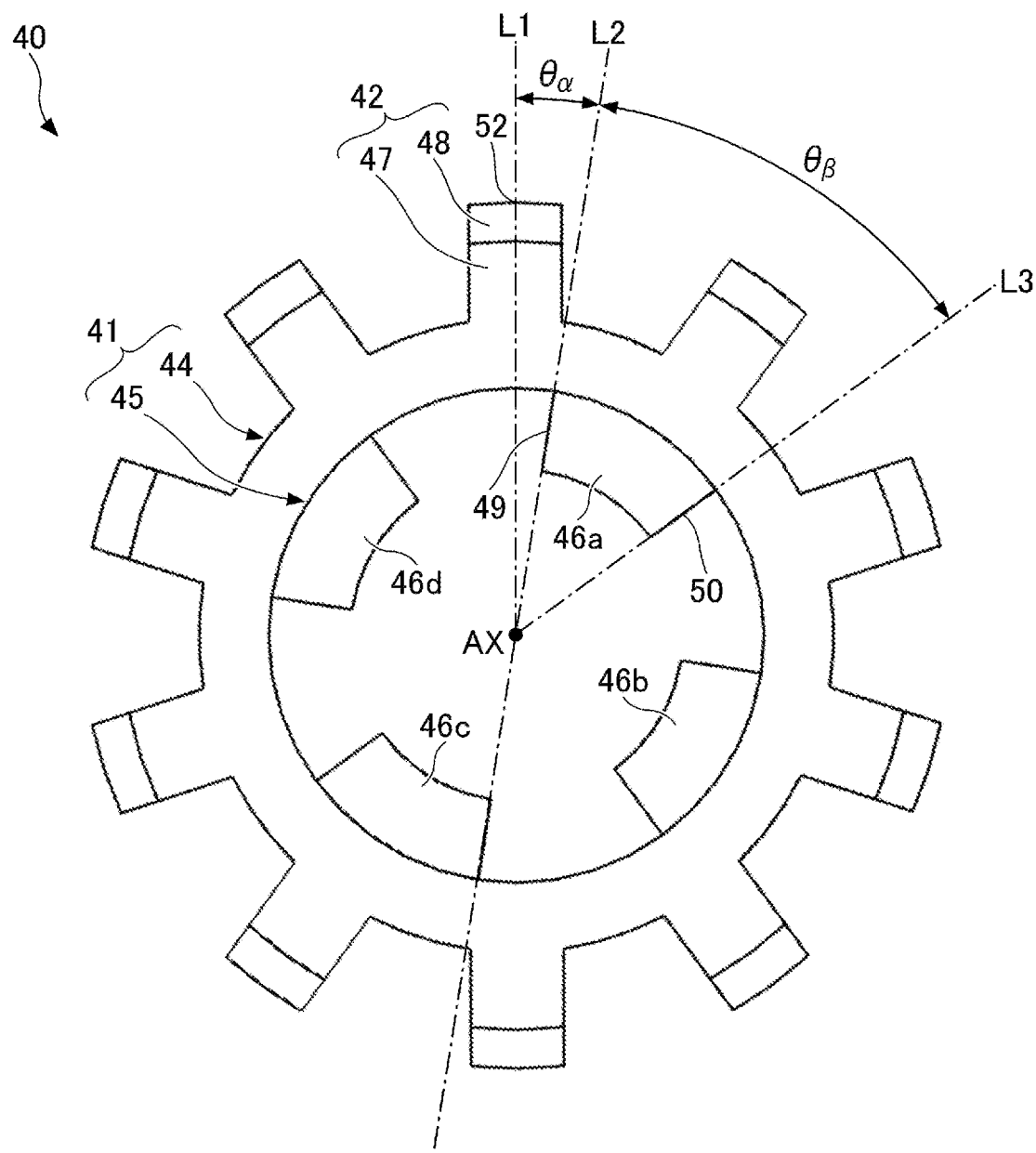
FIG. 5 is a plan view of an example of a core according to the first embodiment when viewed in the axial direction.

FIG. 5 is a plan view of an example of the core according to the first embodiment when viewed in the axial direction. The above-described core 20 has substantially the same configuration as the core 40 illustrated in FIG. 5, and thus, the description of the configuration of the core 20 will be omitted by referring to the description of the core 40.

The core 40 includes the plurality of internal teeth 46 (46a, 46b, 46c, and 46d) of the yoke 41, arranged at equal intervals in the circumferential direction and having the same width in the circumferential direction, and the plurality of claw magnetic poles 42 arranged at equal intervals in the circumferential direction and having the same width in the circumferential direction.

An angle $\theta_\alpha$ represents an angle between the center 52 of the width, in the circumferential direction, of a claw magnetic pole of the plurality of claw magnetic poles 42 and the end (yoke surface 49 in this example), in the circumferential direction, of an internal tooth that is closest to the center 52 of the width of the claw magnetic pole from among the plurality of internal teeth 46. More specifically, when viewed in the axial direction, the angle $\theta_\alpha$ represents a central angle between a line L1, connecting the center 52 of the width of the claw magnetic pole to the rotation axis AX of the rotor 10, and a line L2 connecting the end (yoke surface 49 in this example), in the circumferential direction, of the internal tooth that is closest to the center 52 of the width of the claw magnetic pole to the rotation axis AX of the rotor 10.

An angle $\theta_\beta$ represents an angle between both ends (yoke surfaces 49 and 50 in this example), in the circumferential direction, of an internal tooth of the plurality of internal teeth 46. More specifically, when viewed in the axial direction, the angle $\theta_\beta$ represents a central angle between the line L2, connecting one end (yoke surface 49, in this example), in the circumferential direction, of the internal tooth to the rotation axis AX of the rotor 10, and a line L3 connecting the other end (yoke surface 50 in this example), in the circumferential direction, of the internal tooth to the rotation axis AX of the rotor 10.

The plurality of cores 20 and 40 can be formed in the same shape if the following equations hold:

$$\theta_\alpha = 80/(2 \cdot n) \quad \text{(Equation 1), and}$$

$$\theta_\beta = 360/(2 \cdot N) \quad \text{(Equation 2),}$$

where n represents the number of a plurality of claw magnetic poles 42, and N represents the number of a plurality of internal teeth 46. Accordingly, plurality of cores 20 and 40 can be formed by the same mold, and thus, the manufacturing cost of the stator core 9 can be reduced, for example.

In the example illustrated in FIG. 5, n=10 and N=4. Therefore, the plurality of cores 20 and 40 can be formed in the same shape by setting "$\theta_\alpha=9°$ and $\theta_\beta=45°$" based on the above Equations 1 and 2.

Figure 6:
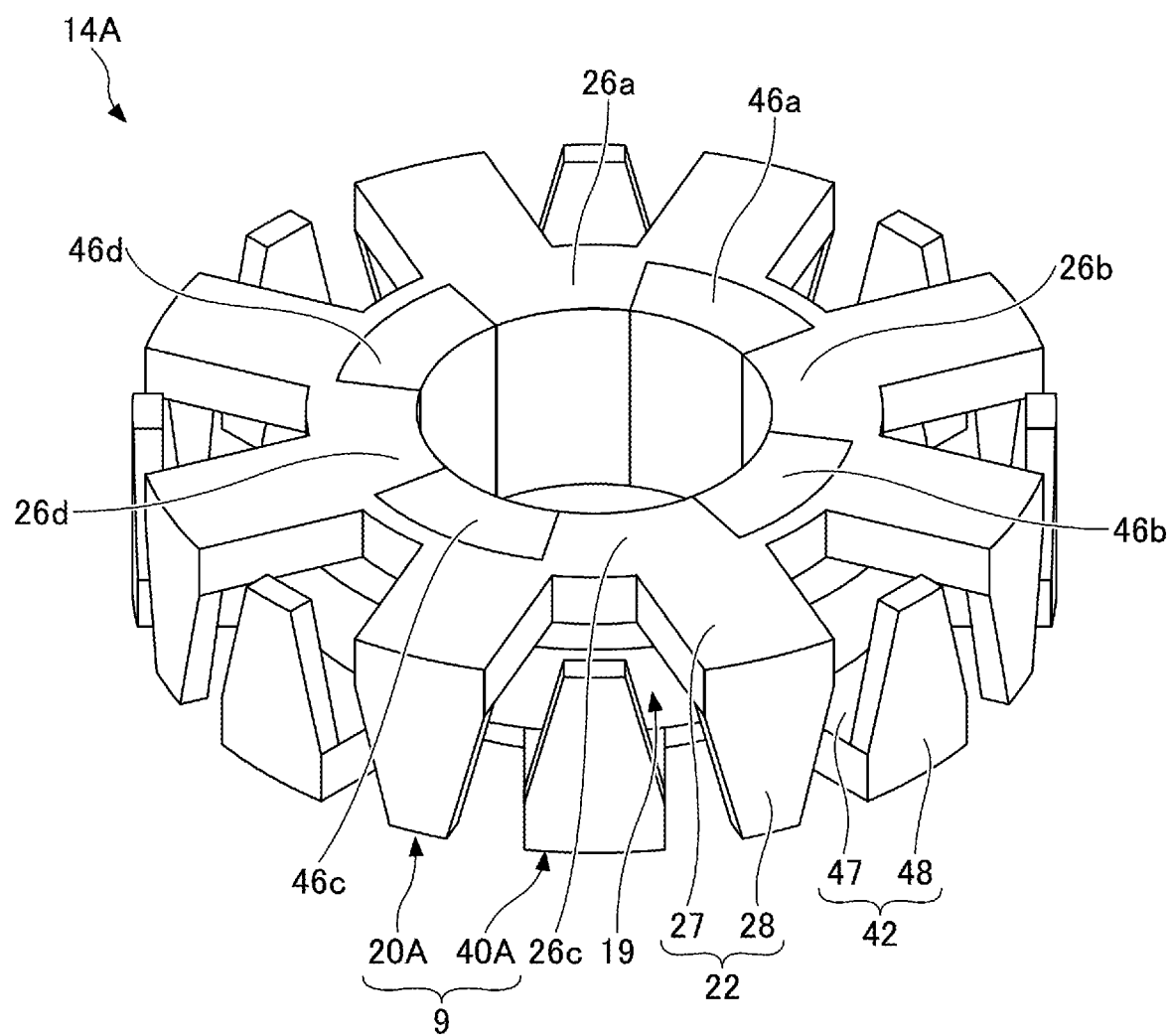
FIG. 6 is a perspective view of an example of a stator unit according to a second embodiment.
Figure 7:
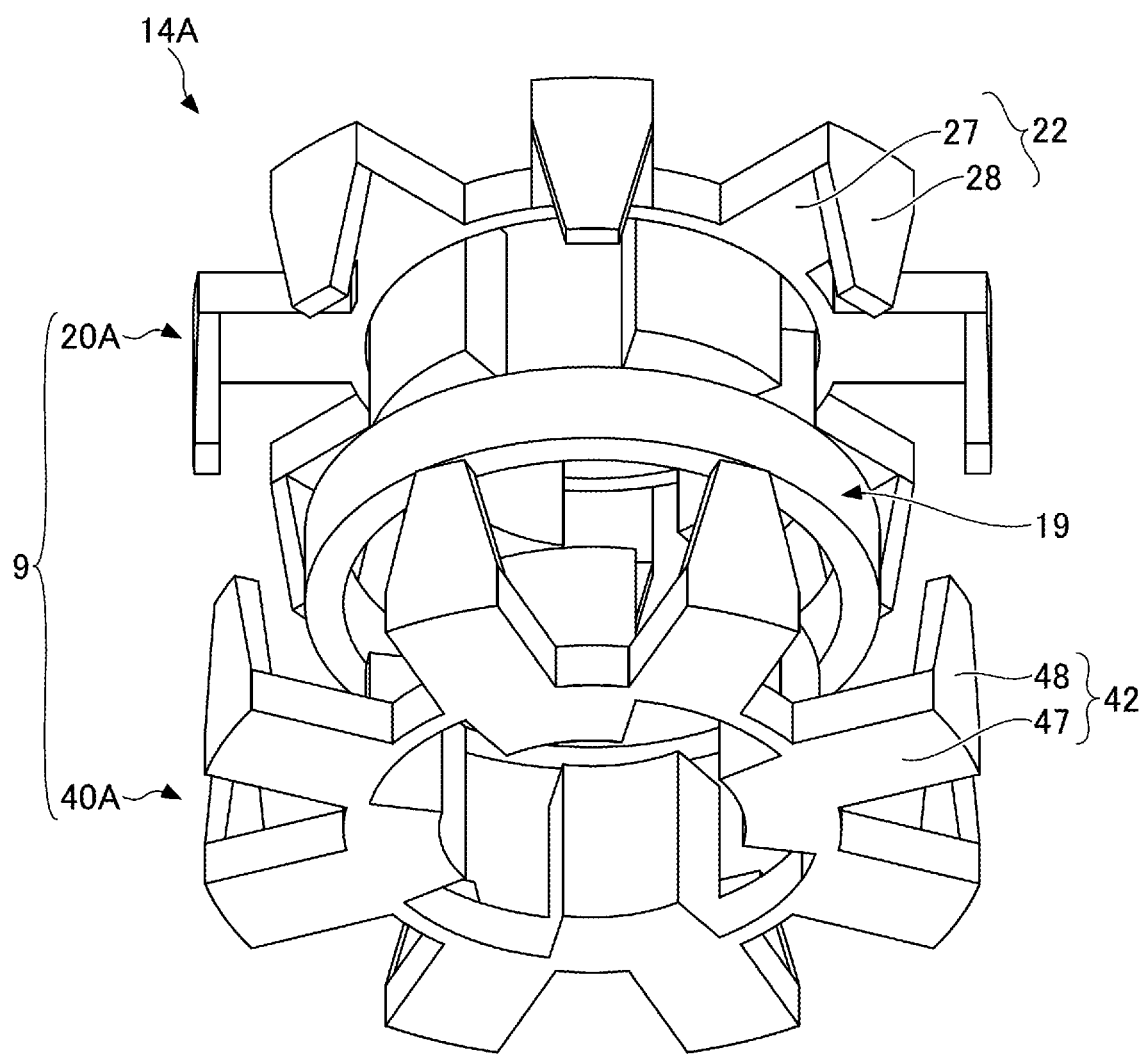
FIG. 7 is an exploded perspective view of an example of the stator unit according to the second embodiment.

FIG. 6 is a perspective view of an example of a stator unit according to a second embodiment. FIG. 7 is an exploded perspective view of an example of the stator unit according to the second embodiment. The description of the same configurations and effects as those of the above embodiment is omitted or simplified by referring to the above description.

In FIG. 6 and FIG. 7, a stator core 9 includes a plurality of cores 20A and 40A facing each other with the winding 19 interposed therebetween in the axial direction of the stator 13. The number and the shape of claw magnetic poles 22 and 42 of a stator unit 14A differs from those of the stator unit 14 according to the first embodiment. A claw magnetic pole portion 28 has a tapered shape in which the width thereof decreases as the distance from a claw magnetic pole portion 27 increases in the axial direction. A claw magnetic pole portion 48 has a tapered shape in which the width thereof decreases as the distance from a claw magnetic pole portion 47 increases in the axial direction.

Figure 8:
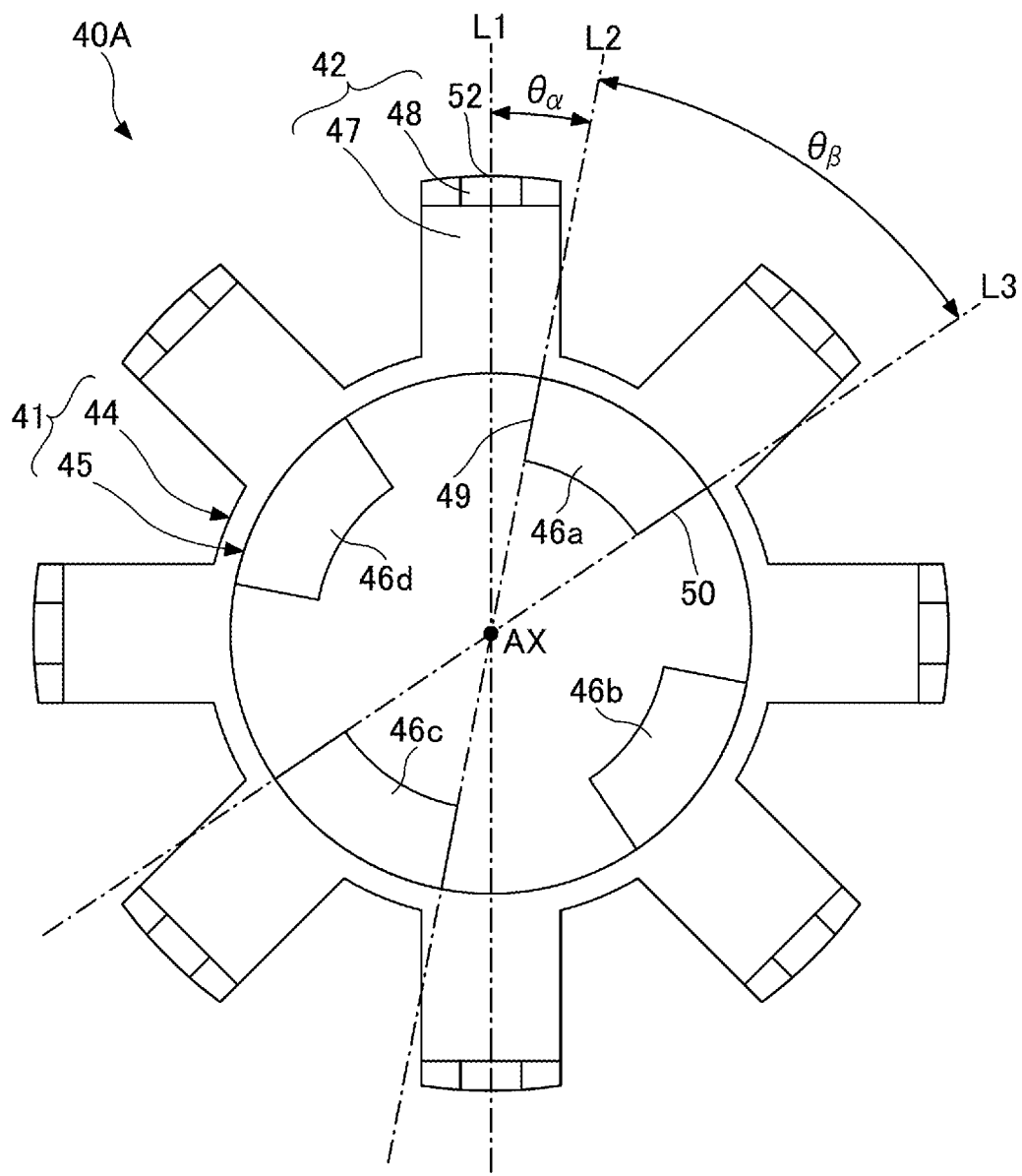
FIG. 8 is a plan view of an example of a core according to the second embodiment when viewed in the axial direction.

FIG. 8 is a plan view of an example of a core according to the second embodiment when viewed in the axial direction. The core 20A has substantially the same configuration as the core 40A illustrated in FIG. 8, and thus, the description of the configuration of the core 20A is omitted by referring to the description of the core 40A.

In the example illustrated in FIG. 8, the number n of claw magnetic poles 42=8 and the number N of internal teeth 46=4. Therefore, the plurality of cores 20A and 40A can be formed in the same shape by setting "$\theta_\alpha=11.25°$ and $\theta_\beta=45°$".

The number of claw magnetic poles 42 (n=8) is a multiple of the number of internal teeth 46 (N=4). Therefore, the core 20A and the core 40A can be assembled by, for example, inserting an internal tooth 26a between an internal tooth 46d and an internal tooth 46a or between the internal teeth 46a and an internal teeth 46b. Accordingly, ease of assembly of the core 20A and the core 40A can be facilitated.

Figure 9:
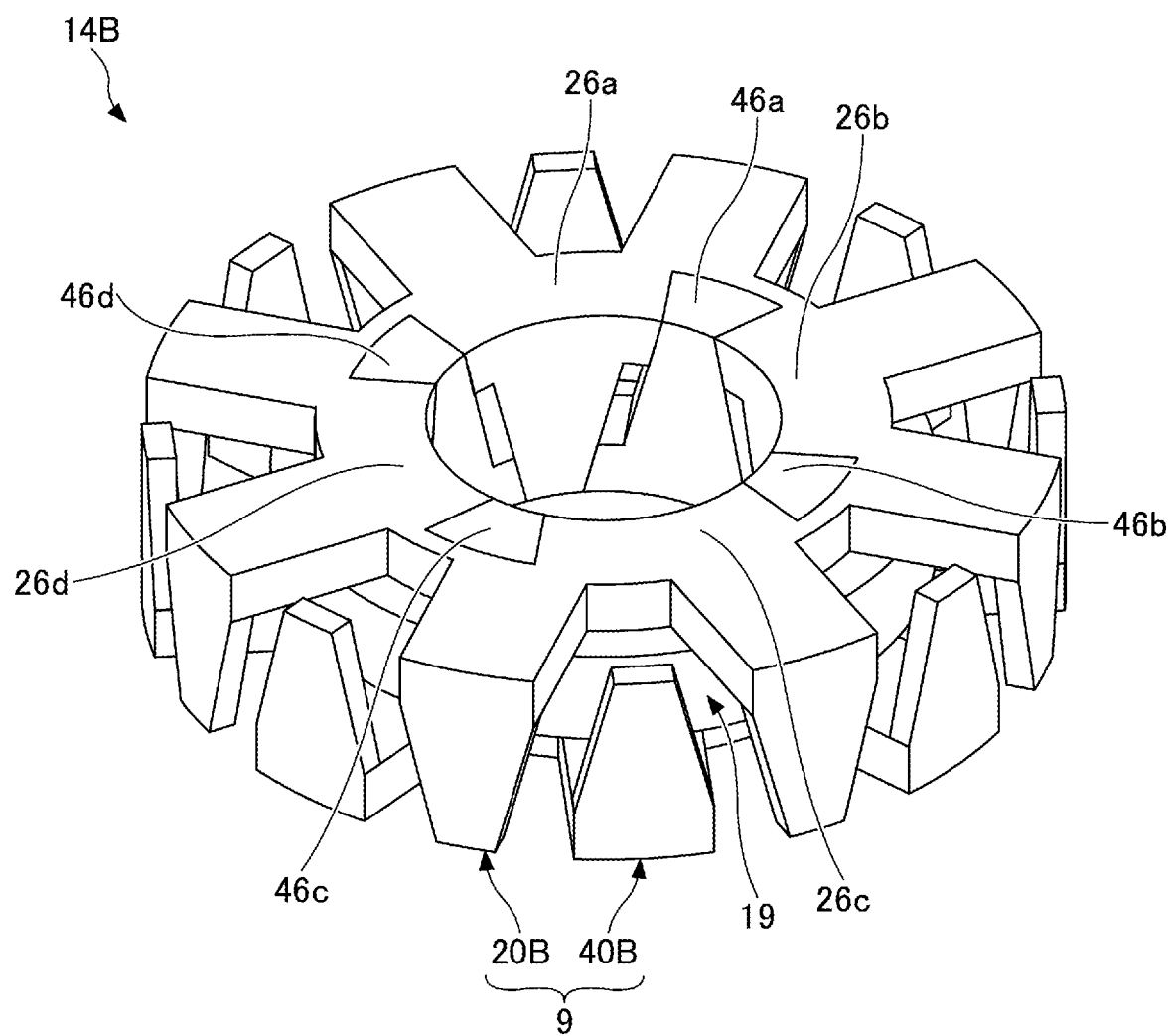
FIG. 9 is a perspective view of an example of a stator unit according to a third embodiment.

FIG. 9 is a perspective view of an example of a stator unit according to a third embodiment. The description of the same configurations and effects as those of the above embodiments is omitted or simplified by referring to the above description.

In FIG. 9, a stator core 9 includes a plurality of cores 20B and 40B facing each other with the winding 19 interposed therebetween in the axial direction of the stator 13. The shapes of internal teeth 26 and 46 of a stator unit 14B differ from those of the stator unit 14A according to the second embodiment.

Figure 10:
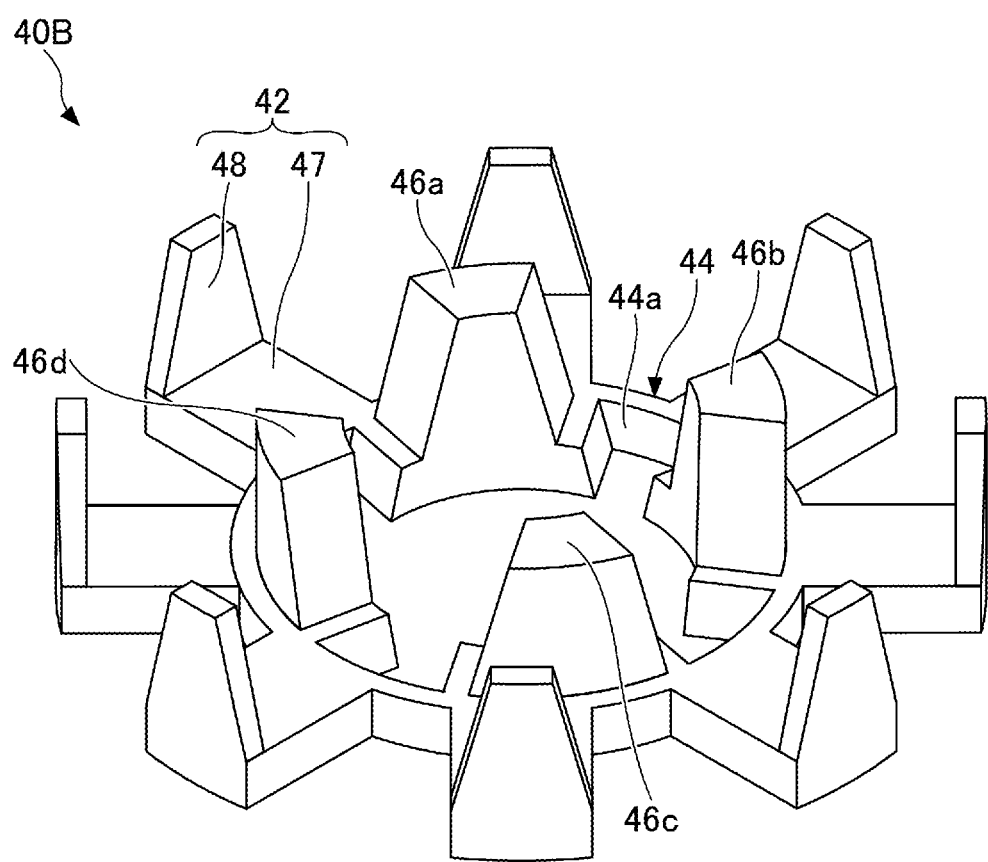
FIG. 10 is a perspective view of an example of a core according to the third embodiment.

FIG. 10 is a perspective view of an example of a core according to the third embodiment. The description of the same configurations and effects as those of the above embodiments is omitted or simplified by referring to the above description. The core 20B has substantially the same configuration as the core 40B illustrated in FIG. 10, and thus, the description of the configuration of the core 20B is omitted by referring to the description of the core 40B.

Each of the internal teeth 46 (46a, 46b, 46c, and 46d) has a tapered shape in which the width thereof decreases as the distance from an inner circumferential surface 44a of a first yoke portion 44 increases in the axial direction. Because each of the internal teeth 26 and 46 has such a tapered shape, the core 20B and the core 40B can be readily assembled in the axial direction.

In the example illustrated in FIG. 10, the number n of claw magnetic poles 42=8 and the number N of internal teeth 46=4. Therefore, the plurality of cores 20B and 40B can be formed in the same shape by setting "$\theta_\alpha=11.25°$ and $\theta_\beta=45°$".

Figure 11:
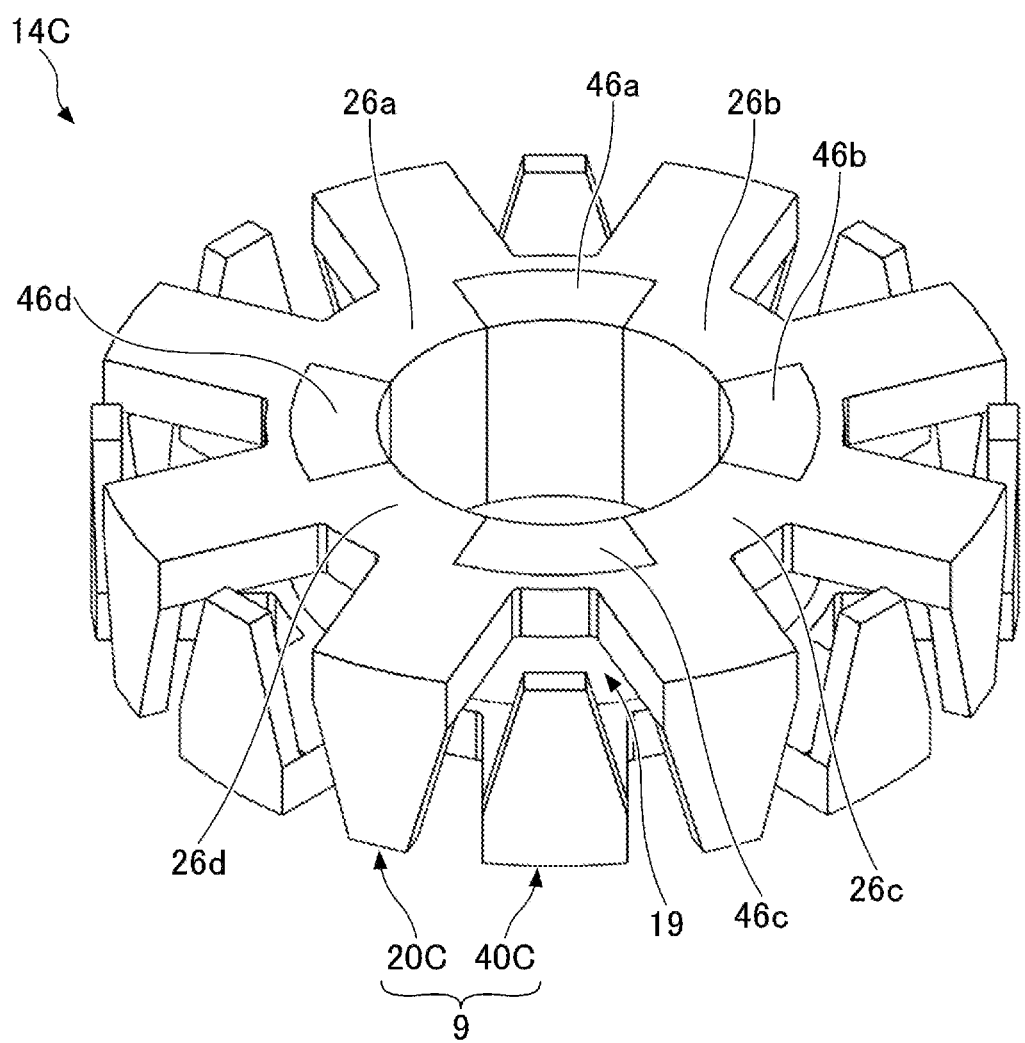
FIG. 11 is a perspective view of an example of a stator unit according to a fourth embodiment.

FIG. 11 is a perspective view of an example of a stator unit according to a fourth embodiment. The description of the same configurations and effects as those of the above embodiments is omitted or simplified by referring to the above description.

In FIG. 11, a stator core 9 includes a plurality of cores 20C and 40C facing each other with the winding 19 interposed therebetween in the axial direction of the stator 13. A stator unit 14C differs from the stator unit 14A according to the second embodiment in that the two cores (cores 20C and 40C) do not have the same shape.

Figure 12:
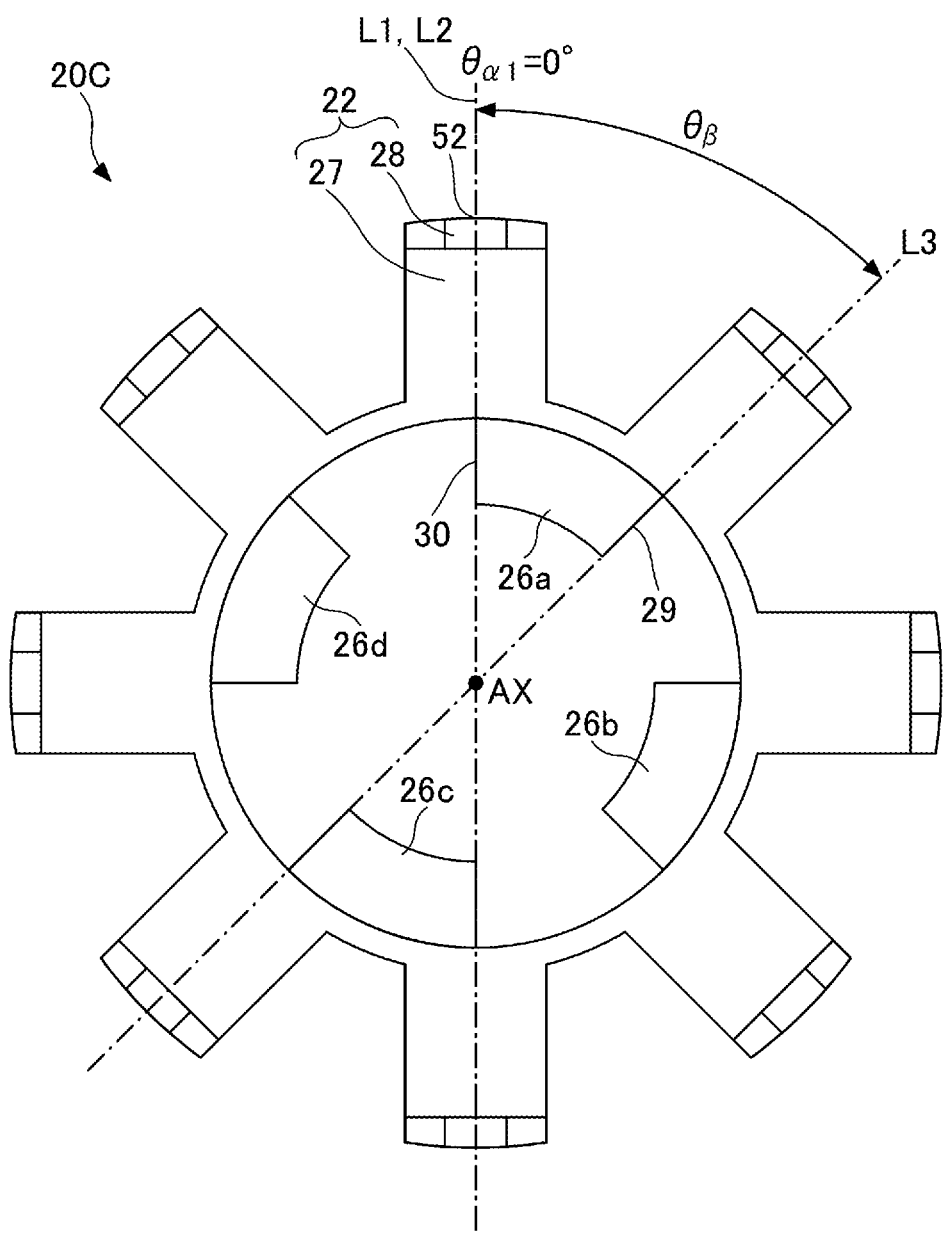
FIG. 12 is a plan view of an example of one core according to the fourth embodiment when viewed in the axial direction.
Figure 13:
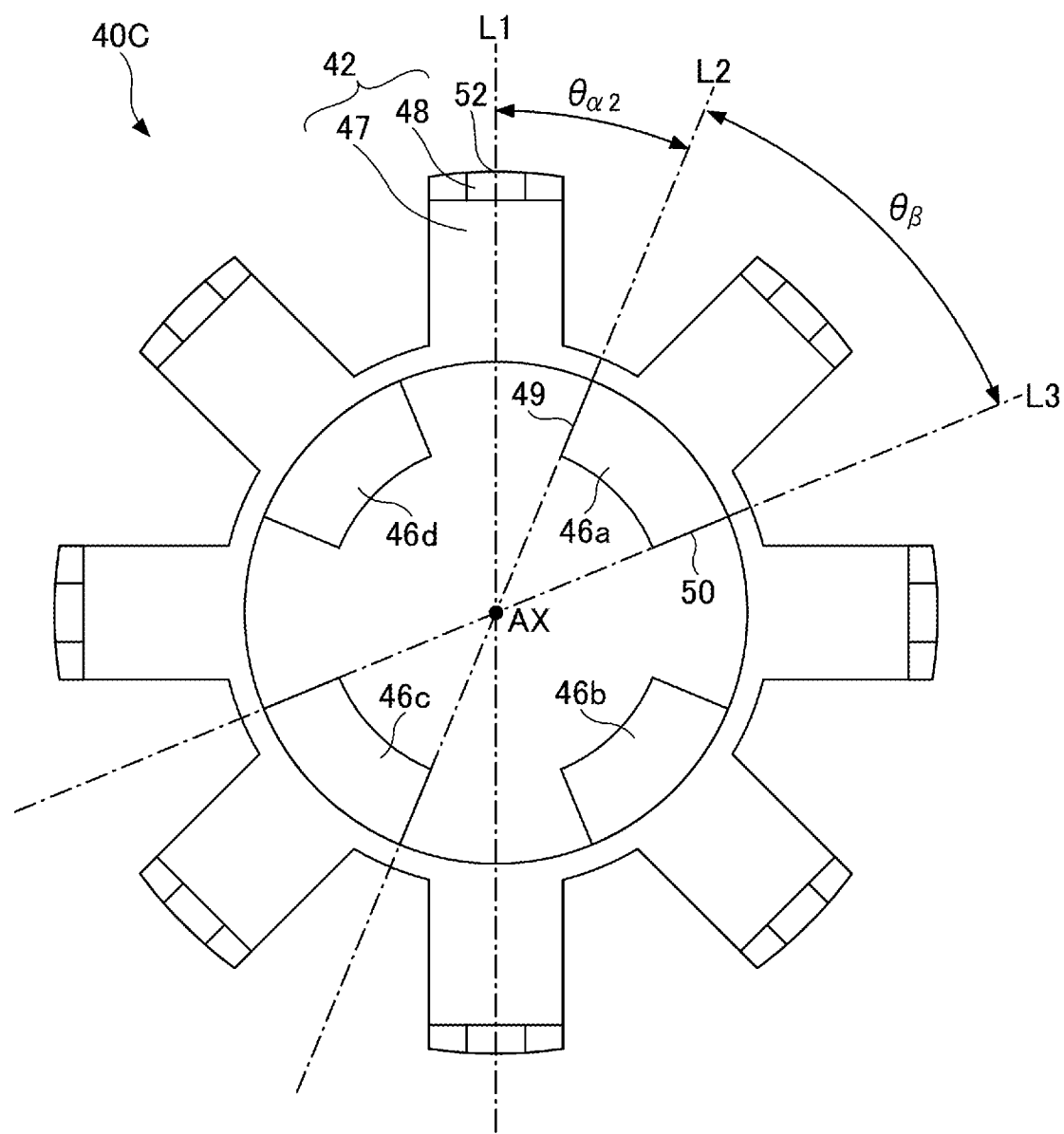
FIG. 13 is a plan view of an example of the other core according to the fourth embodiment when viewed in the axial direction.

FIG. 12 is a plan view of an example of one of the cores according to the fourth embodiment when viewed in the axial direction. FIG. 13 is a plan view of an example of the other core according to the fourth embodiment when viewed in the axial direction. FIG. 12 depicts the core 20C, and FIG. 13 depicts the core 40C.

In FIG. 12, an angle $\theta_{\alpha 1}$ represents an angle between the center 52 of the width, in the circumferential direction, of a claw magnetic pole of a plurality of claw magnetic poles 2 and the end (yoke surface 30 in this example), in the circumferential direction, of an internal tooth that is closest to the center 52 of the width of the claw magnetic pole from among a plurality of internal teeth 26. More specifically, when viewed in the axial direction, the angle $\theta_{\alpha 1}$ represents a central angle between a line L1, connecting the center 52 of the width of the claw magnetic pole to the rotation axis AX of the rotor 10, and a line L2 connecting the end (yoke surface 30 in this example), in the circumferential direction, of the internal tooth that is closest to the center 52 of the width of the claw magnetic pole to the rotation axis AX of the rotor 10. In the example of FIG. 12, the angle $\theta_{\alpha 1} 0°$.

In FIG. 12, an angle $\theta_\beta$ represents an angle between both ends (yoke surfaces 29 and 30 in this example), in the circumferential direction, of an internal tooth of the plurality of internal teeth 26. More specifically, when viewed in the axial direction, the angle $\theta_\beta$ represents a central angle between the line L2, connecting one end (yoke surface 30 in this example), in the circumferential direction, of the internal tooth to the rotation axis AX of the rotor 10, and a line L3 connecting the other end (yoke surface 29 in this example), in the circumferential direction, of the internal tooth to the rotation axis AX of the rotor 10.

In FIG. 13, an angle $\theta_{\alpha 2}$ represents an angle between the center 52 of the width, in the circumferential direction, of a claw magnetic pole of a plurality of claw magnetic poles 42 and the end (yoke surface 49 in this example), in the circumferential direction, of an internal tooth that is closest to the center 52 of the width of the claw magnetic pole from among a plurality of internal teeth 46. More specifically, when viewed in the axial direction, the angle $\theta_{\alpha 2}$ represents a central angle between a line L1, connecting the center 52 of the width, in the circumferential direction, of the claw magnetic pole to the rotation axis AX of the rotor 10, and a line L2 connecting the end (yoke surface 49 in this example), in the circumferential direction, of the internal tooth that is closest to the center 52 of the width of the claw magnetic pole to the rotation axis AX of the rotor 10.

In FIG. 13, an angle $\theta_\beta$ represents an angle between both ends (yoke surfaces 49 and 50 in this example), in the circumferential direction, of an internal tooth of the plurality of internal teeth 46. More specifically, when viewed in the axial direction, the angle $\theta_\beta$ represents a central angle between the line L2, connecting one end (yoke surface 49 in this example), in the circumferential direction, of the internal tooth to the rotation axis AX of the rotor 10, and a line L3 connecting the other end (yoke surface 50 in this example), in the circumferential direction, of the internal tooth to the rotation axis AX of the rotor 10.

In a case where the cores have different $\theta_{\alpha 1}$ and $\theta_{\alpha 2}$, the value of $\theta_{\alpha 2}$ of the core 40C facing the core 20C is calculated based on the values of $\theta_{\alpha 1}$ and $\theta_\beta$ of the core 20C. The calculation equation is as follows.

$$\theta_{\alpha 2}=\theta_{\alpha 1}/2+\theta_\beta/2 \quad \text{(Equation 3)}$$

Note that the core 20C and the core 40C are required to have the same number and shape of internal teeth.

For example, when the number N of internal teeth is 4, "$\theta_\beta=45°$" based on Equation 2 above. Therefore, $\theta_{\alpha 2}$ of the core 40C facing the core 20C having $\theta_{\alpha 1}$ of 30° is 37.5° based on Equation 3. For example, when the number N of internal teeth is 4, "$\theta_\beta=45°$" based on Equation 2 above. Therefore, $\theta_{\alpha 2}$ of the core 40C facing the core 20C having $\theta_{\alpha 1}$ of 0° is 22.5° based on Equation 3.

In FIG. 12, in a plan view along the axial direction, the yoke surface 30 is positioned on the line L1 connecting the center 52 of the width, in the circumferential direction, of at least one claw magnetic pole 22 of the plurality of claw magnetic poles 22 to the rotation axis AX of the rotor 10. The magnetic flux, entering from the claw magnetic pole 22 toward the rotation axis AX, is divided between the internal tooth 26a side and the internal tooth 46d side (see FIG. 13). Therefore, when the yoke surface 30 is positioned on the line L1, the magnetic flux passing through the yoke surface 30 is reduced. Accordingly, the magnetic resistance of a magnetic circuit through which the magnetic flux passes can be reduced, and the torque of the motor 1 can be thus increased.

Figure 14:
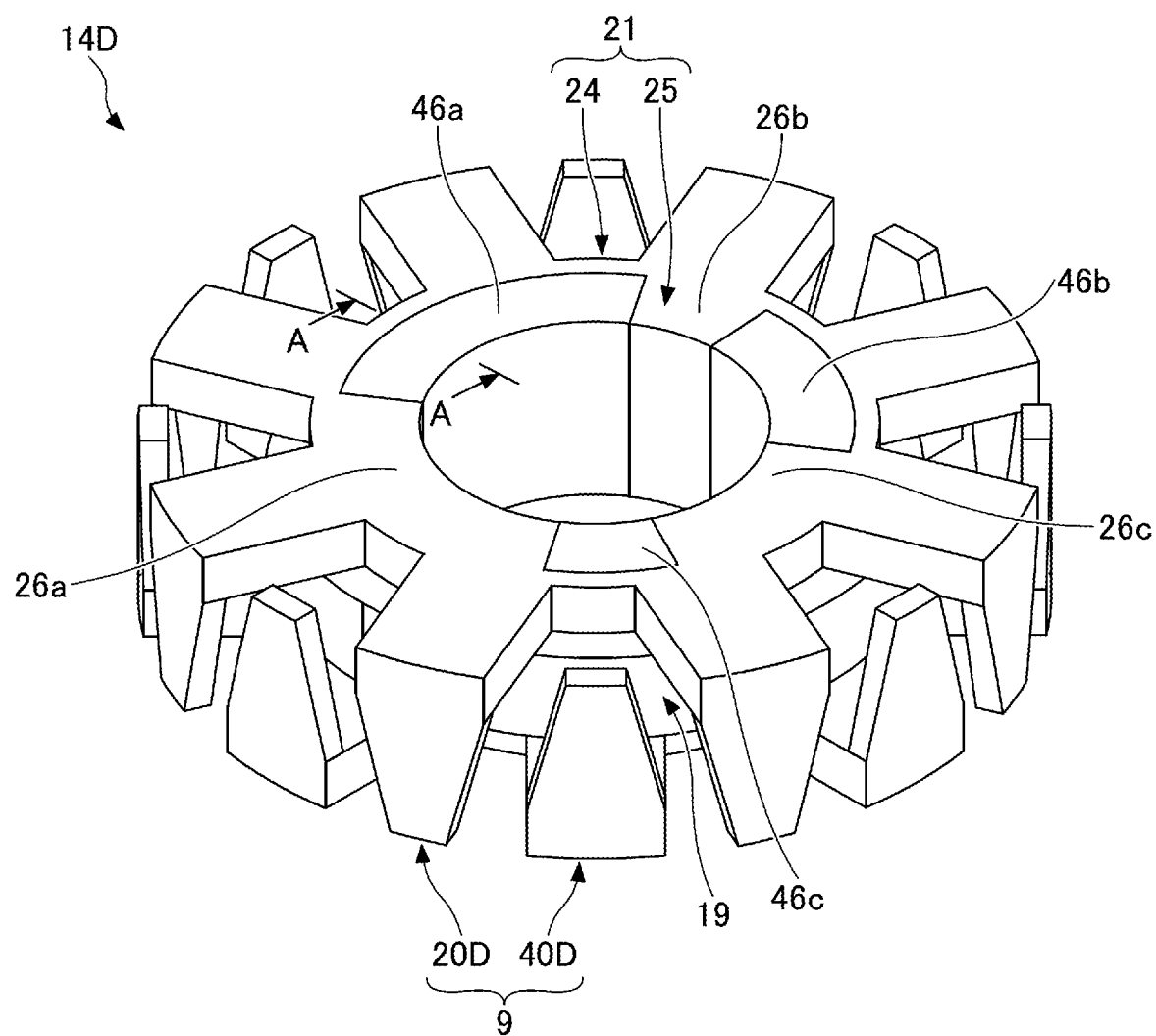
FIG. 14 is a perspective view of an example of a stator unit according to a fifth embodiment.

FIG. 14 is a perspective view of an example of a stator unit according to a fifth embodiment. The description of the same configurations and effects as those of the above embodiments is omitted or simplified by referring to the above description.

In FIG. 14, a stator core 9 includes a plurality of cores 20D and 40D facing each other with the winding 19 interposed therebetween in the axial direction of the stator 13. A stator unit 14D differs from the stator unit 14A according to the second embodiment in that a plurality of internal teeth 26 do not have the same width in the circumferential direction and a plurality of internal teeth 46 do not have the same width in the circumferential direction.

Figure 15:
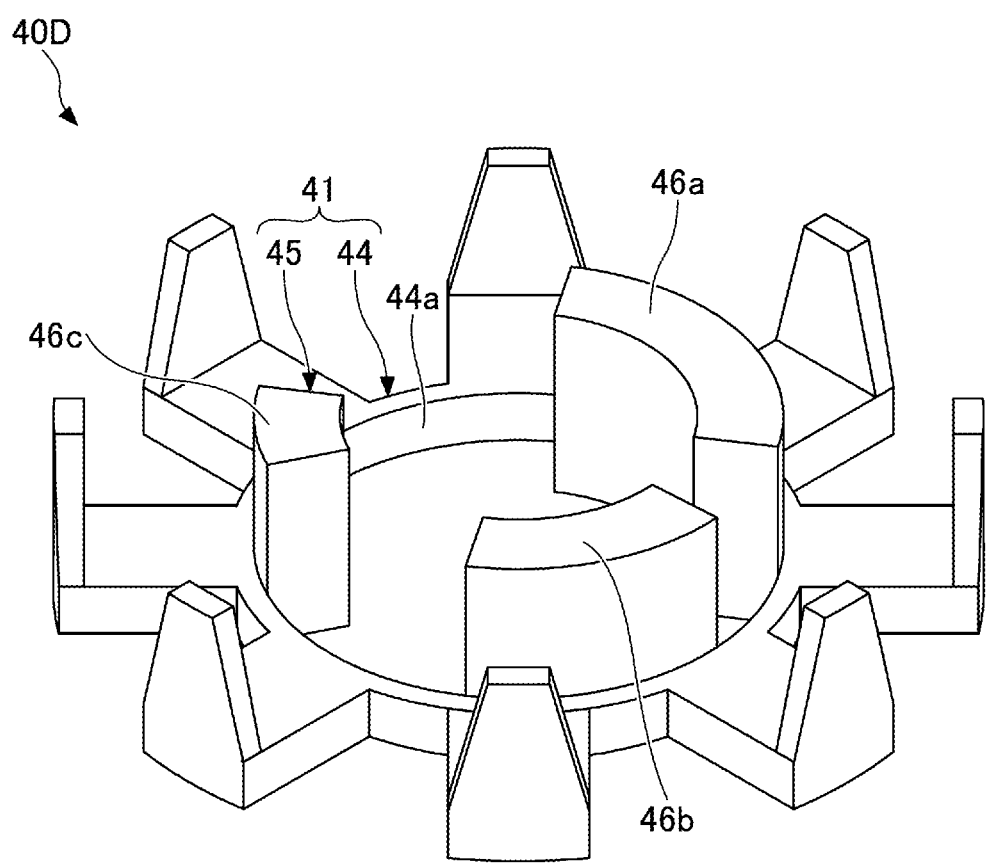
FIG. 15 is a perspective view of an example of a core according to the fifth embodiment.
Figure 16:
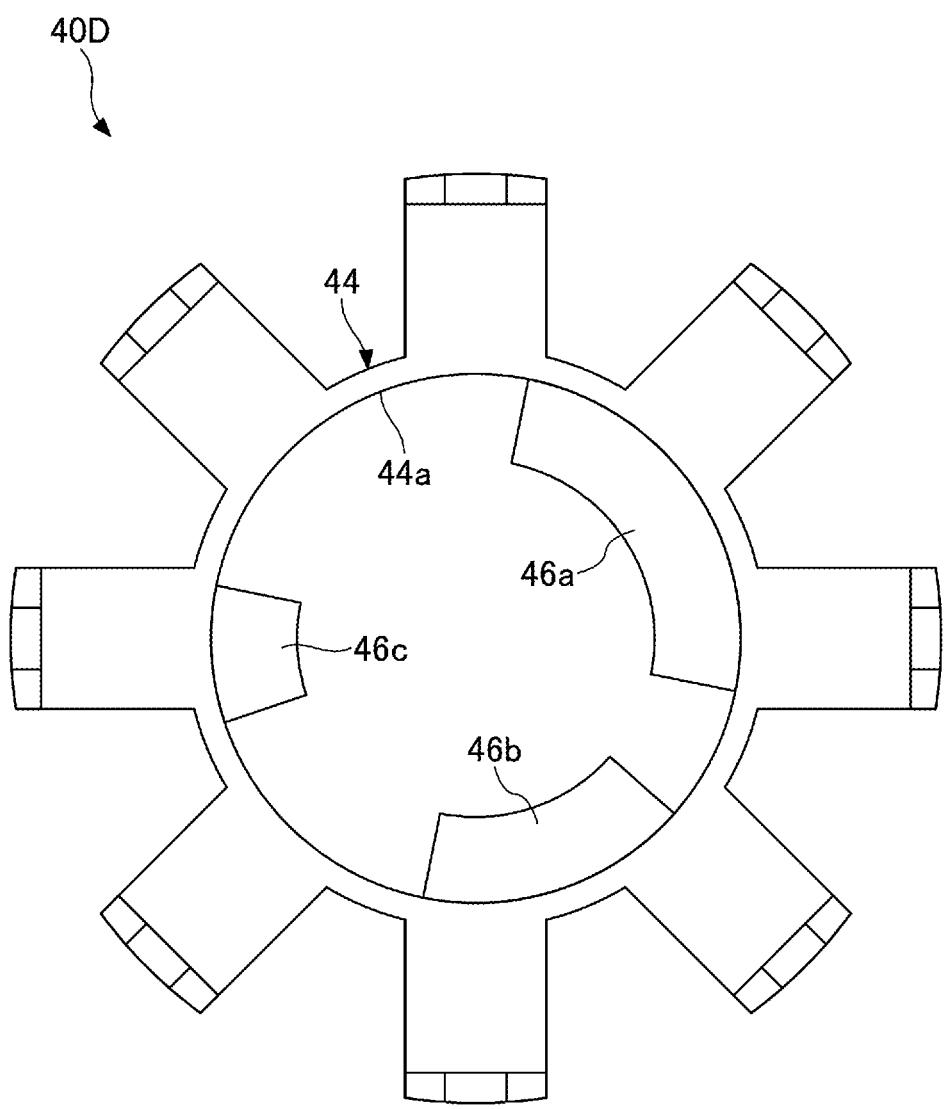
FIG. 16 is a plan view of an example of the core according to the fifth embodiment when viewed in the axial direction.

FIG. 15 is a perspective view of an example of a core according to the fifth embodiment. FIG. 16 is a plan view of an example of the core according to the fifth embodiment when viewed in the axial direction. The description of the same configurations and effects as those of the above embodiments is omitted or simplified by referring to the above description. The core 20D has substantially the same configuration as the core 40D illustrated in FIG. 15 and FIG. 16, and thus, the description of the configuration of the core 20D is omitted by referring to the description of the core 40D.

Each of internal teeth 46a, 46b, and 46c protrudes in the axial direction while having a constant curved width (more specifically, a constant arc length) regardless of the distance from an inner circumferential surface 44a of a first yoke portion 44. The curved widths of the internal teeth 46a, 46b, and 46c differ from each other.

Figure 17:
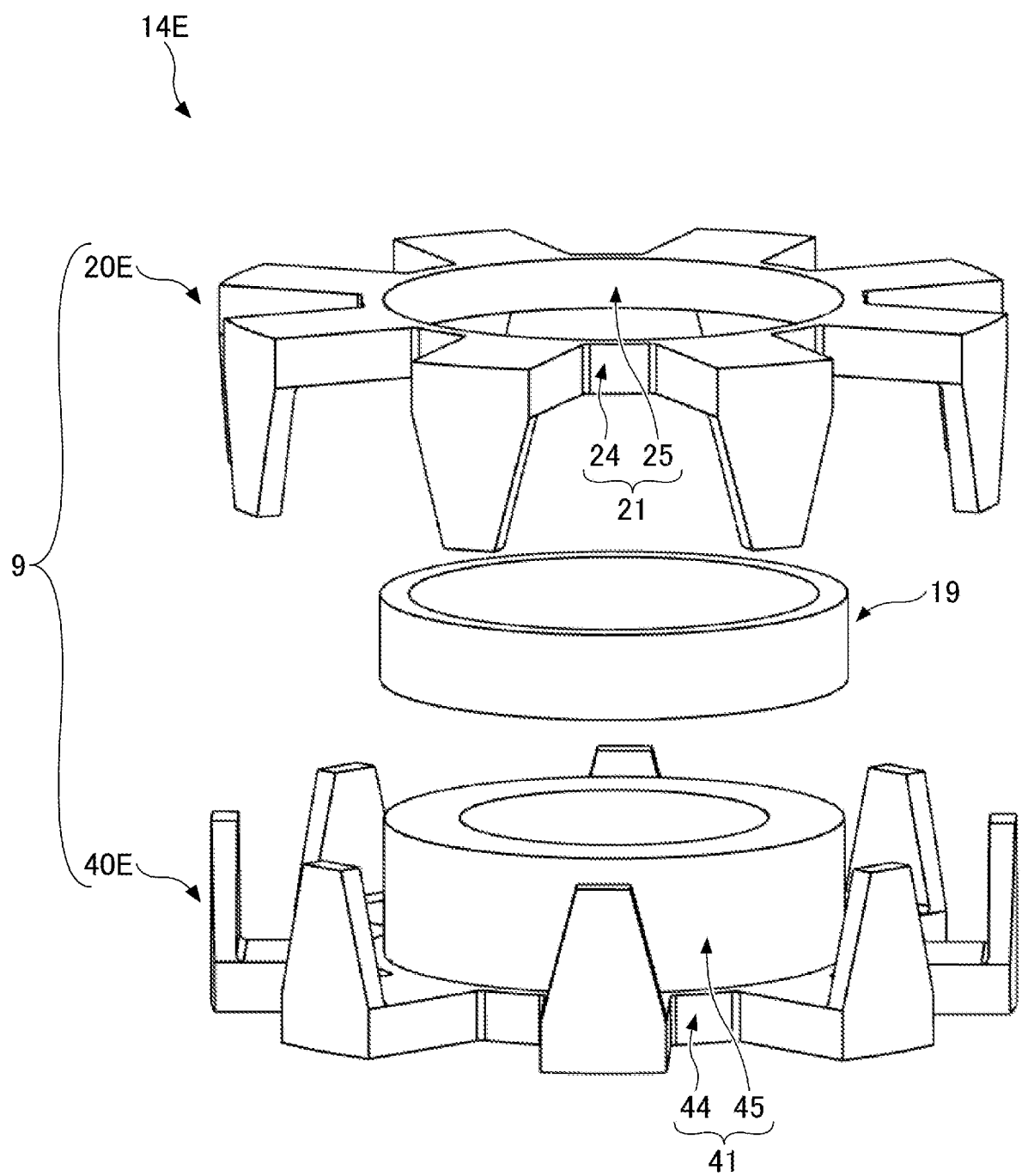
FIG. 17 is an exploded perspective view of an example of a stator unit according to a sixth embodiment.

FIG. 17 is an exploded perspective view of an example of a stator unit according to a sixth embodiment. The description of the same configurations and effects as those of the above embodiments is omitted or simplified by referring to the above description.

In FIG. 17, a stator core 9 includes a plurality of cores 20E and 40E facing each other with the winding 19 interposed therebetween in the axial direction of the stator 13. In a stator unit 14E, the shapes of yokes 21 and 41 differ from those of the stator unit 14A according to the second embodiment.

The yoke 21 illustrated in FIG. 17 has an annular shape when viewed in the axial direction, and has a predetermined thickness in the axial direction. The yoke 21 includes a first yoke portion 24 having a substantially annular shape and a second yoke portion 25 that contacts the other core 40E. In the example illustrated in FIG. 17, the first yoke portion 24 is an outer peripheral portion of the yoke 21 having a substantially annular shape, and the second yoke portion 25 is an inner peripheral portion of the yoke 21 having a substantially annular shape.

The yoke 41 illustrated in FIG. 17 has an annular shape when viewed in the axial direction, and has a predetermined thickness in the axial direction. The yoke 41 includes a first yoke portion 44 having a substantially annular shape and a second yoke portion 45 that contacts the other core 20E. In the example illustrated in FIG. 17, the first yoke portion 44 is a substantially annular portion of the yoke 41. The second yoke portion 45 is a cylindrical portion that protrudes from the first yoke portion 44 toward the other core 20E by a predetermined amount. The outer surface of the second yoke portion 45 having a cylindrical shape is in contact with or in proximity to the second yoke portion 25 (the inner peripheral portion of the yoke 21 having a substantially annular shape).

Figure 18:
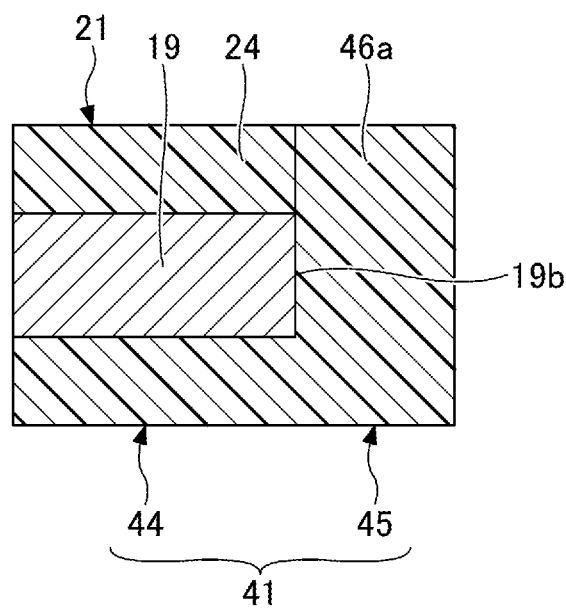
FIG. 18 is a cross-sectional view of a first example configuration of a yoke taken through A-A of FIG. 14.
Figure 19:
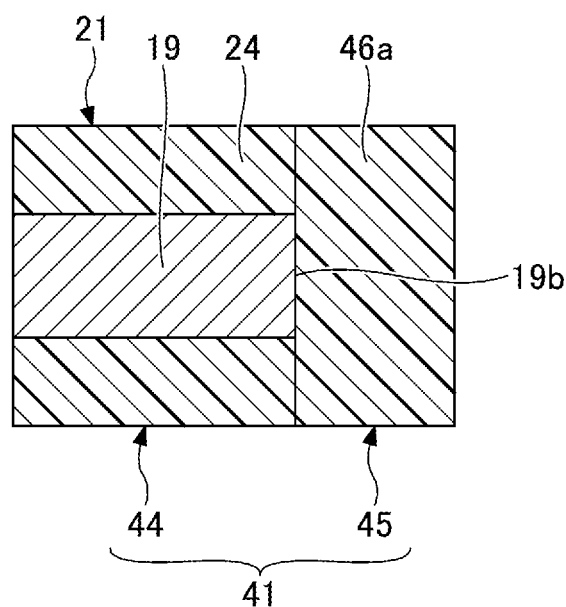
FIG. 19 is a cross-sectional view of a second example configuration of a yoke taken through A-A of FIG. 14.

FIG. 18 is a cross-sectional view of a first example configuration of a yoke taken through A-A of FIG. 14. In FIG. 18, a second yoke portion 45 is formed integrally with a first yoke portion 44. FIG. 19 is a cross-sectional view of a second example configuration of a yoke taken through A-A of FIG. 14. In FIG. 19, a second yoke portion 45 is formed separately from a first yoke portion 44. Similarly, a first yoke portion 24 may be formed integrally with or separately from a second yoke portion 25. In the embodiments other than FIG. 14, a first yoke portion may be formed integrally with or separately from a second yoke portion.

Although embodiments have been described above, it will be understood that various modifications may be made to the configurations and details thereof without departing from the spirit and scope of the claims. Various modifications and improvements such as combinations and replacements with part or all of other embodiments are possible.

For example, if a yoke portion has surfaces that face each other in the axial direction, the surfaces that face each other in the axial direction do not preferably contact each other. Further, the distance between the surfaces that face each other in the axial direction is preferably set to be greater than the distance between yoke surfaces that are substantially parallel to the axial direction. With this configuration, even if a large dimensional error occurs in the axial direction, the error can be absorbed.

For example, in the above-described embodiments, the motor 1 is an outer-rotor-type claw pole motor in which the rotor 10 is disposed radially outward relative to the stator 13. However, the rotary electrical device according to the present disclosure can be applied to an inner-rotor-type claw pole motor in which a rotor is disposed radially inward relative to a stator. An inner-rotor-type rotary electrical device includes a rotor having a substantially solid cylindrical shape and configured to be rotatable, and a stator having a substantially annular shape and disposed radially outward relative to the rotor to surround the rotation axis of the rotor.

This international application is based on and claims priority to Japanese Patent Application No. 2020-083123, filed on May 11, 2020, the entire contents of which are incorporated herein by reference.

DESCRIPTION OF THE REFERENCE NUMERALS 1 motor
8 through-hole
9 stator core
10 rotor
11 rotor core
12 permanent magnet
13 stator
14 to 16 stator unit
17, 18 non-magnetic material layer
19 winding
19a outer circumferential portion
19b inner circumferential portion
20, 40 core
21, 41 yoke
22, 42 claw magnetic pole
23, 43 center hole
24, 44 first yoke portion
24a, 44a inner circumferential surface
24b, 44b outer circumferential surface
25, 45 second yoke portion
26a, 26b, 26c, 26d, 46a, 46b, 46c, 46d internal tooth
27, 28, 47, 48 claw magnetic pole portion
29, 30, 49, 50 yoke surface
31, 51 outer peripheral surface
52 center of width
AX rotation axis
L1, L2 line

The invention claimed is:

1. A rotary electrical device comprising:
a rotor having a substantially hollow cylindrical shape or a substantially solid cylindrical shape and configured to be rotatable; and
a stator having a substantially annular shape and disposed in a radial direction of the rotor to surround a rotation axis of the rotor,
wherein the stator includes a winding that is wound in a substantially annular shape around the rotation axis, and a stator core that surrounds the winding and is constituted by a magnetic powder core,
wherein the stator core includes a plurality of cores facing each other with the winding interposed therebetween in an axial direction of the stator,
wherein one core of the plurality of cores includes a yoke that is in contact with one other core of the plurality of cores, and one or more claw magnetic poles that protrude from the yoke toward the rotor in the radial direction,
wherein the one or more claw magnetic poles of the one core of the plurality of cores are alternately arranged with claw magnetic poles of the one other core, with which or to which the yoke is in contact, in a circumferential direction of the stator,
wherein the yoke has at least one yoke surface that is substantially parallel to the axial direction, and
wherein the yoke surface of the yoke of the one core of the plurality of cores includes a surface that is in contact with a yoke surface of a yoke of the one other core in the circumferential direction.

2. The rotary electrical device according to claim 1, wherein a length of the yoke surface in the axial direction is greater than a half of a length of the yoke in the axial direction.

3. The rotary electrical device according to claim 1, wherein only the yoke surface of the one core is in contact with the one other core.

4. The rotary electrical device according to claim 1, wherein the yoke surface of the one core is in contact with the one other core in the radial direction.

5. The rotary electrical device according to claim 1, wherein, in a plan view along the axial direction, the yoke surface is positioned on a line connecting a center of a width, in the circumferential direction, of at least one claw magnetic pole of the plurality of claw magnetic poles to the rotation axis of the rotor.

6. The rotary electrical device according to claim 1, wherein the plurality of cores have a same shape.

7. The rotary electrical device according to claim 1, wherein the yoke includes a plurality of internal teeth arranged at equal intervals in the circumferential direction, the plurality of internal teeth having a same width in the circumferential direction, and wherein $\theta_\alpha = 180/(2 \cdot n)$, and $\theta_\beta = 360/(2 \cdot N)$ hold, where $\theta_\alpha$ represents an angle in degrees between a center of a width, in the circumferential direction, of each of the claw magnetic poles and an end, in the circumferential direction, of an internal tooth that is closest to the center of the width, n represents a number of the plurality of claw magnetic poles, and $\theta_\beta$ represents an angle in degrees between both ends, in the circumferential direction, of each of the claw magnetic poles, and N represents a number of the plurality of internal teeth.

8. The rotary electrical device according to any claim 7, wherein n is equal to N or is a multiple of N.

* * * * *